US012364887B2

(12) United States Patent
Hackett et al.

(10) Patent No.: US 12,364,887 B2
(45) Date of Patent: Jul. 22, 2025

(54) CONCEALED WINDOW SPRINKLER FRAME ARMS AND BODY ORIENTATION

(71) Applicant: Tyco Fire Products LP, Lansdale, PA (US)

(72) Inventors: Robert Hackett, Cranston, RI (US); Sean E Cutting, West Warwick, RI (US); Narayana Rayapati, Cranston, RI (US); Matthew Neal, Coventry, RI (US); Manuel R. Silva, Jr., Cranston, RI (US)

(73) Assignee: Tyco Fire Products LP, Cranston, RI (US)

(*) Notice: Subject to any disclaimer, the term of this patent is extended or adjusted under 35 U.S.C. 154(b) by 0 days.

(21) Appl. No.: 17/533,392

(22) Filed: Nov. 23, 2021

(65) Prior Publication Data

US 2022/0088426 A1 Mar. 24, 2022

Related U.S. Application Data

(63) Continuation of application No. 16/717,347, filed on Dec. 17, 2019.

(Continued)

(51) Int. Cl.

*A62C 2/06* (2006.01)
*A62C 37/10* (2006.01)
*B05B 1/26* (2006.01)

(52) U.S. Cl.

CPC ................ *A62C 3/14* (2013.01); *A62C 37/10* (2013.01); *B05B 1/267* (2013.01)

(58) Field of Classification Search

CPC ................................. A62C 3/14; A62C 37/10
See application file for complete search history.

(56) References Cited

U.S. PATENT DOCUMENTS 1,439,177 A * 12/1922 Loepsinger ............. B05B 1/267 239/522
2,101,694 A * 12/1937 Tyden .................... A62C 37/12 239/522

(Continued)

FOREIGN PATENT DOCUMENTS

KR 20100079313 A 5/2012
WO WO-2020/223603 A1 11/2020

OTHER PUBLICATIONS

Globe Fire Sprinkler Corporation, Data Sheet GFS-360, "'The Inch' Residential Automatic Sprinklers GL4906 One Inch Adjustable Flat Plate Concealed Pendent", Dec. 2016, 2 pages.

(Continued)

*Primary Examiner* — Joseph A Greenlund
(74) *Attorney, Agent, or Firm* — Foley & Lardner LLP

(57) ABSTRACT

A fire exposure protection sprinkler assembly provides fire exposure protection for one or more windows and includes a fire exposure protection sprinkler, a sealing assembly configured to unseal in response to a fire such that fire exposure protection fluid may flow from the fire exposure protection sprinkler, and a housing having a pair of legs, with each of the legs having an aperture. The assembly also includes a deflection assembly configured to extend from the housing due to gravity and activation of a cover plate, with a deflector configured to disperse the fire exposure protection fluid over the one or more windows so as to wet the one or more windows.

14 Claims, 13 Drawing Sheets

Related U.S. Application Data

(60) Provisional application No. 62/899,002, filed on Sep. 11, 2019.

(56) References Cited

U.S. PATENT DOCUMENTS

| | | | | | |
|---|---|---|---|---|---|
| 3,880,239 | A * | 4/1975 | Vorkapich | A62C 37/12 | 239/524 |
| 4,014,388 | A | 3/1977 | Anderson | | |
| 4,296,815 | A * | 10/1981 | Mears | A62C 37/10 | 169/37 |
| 5,727,737 | A * | 3/1998 | Bosio | A62C 31/02 | 169/37 |
| 5,810,263 | A * | 9/1998 | Tramm | B05B 1/265 | 239/518 |
| 6,044,912 | A * | 4/2000 | Tsuji | A62C 37/12 | 169/42 |
| 6,089,477 | A | 7/2000 | Dillon | | |
| 6,098,718 | A * | 8/2000 | Sato | A62C 31/02 | 239/524 |
| 6,123,153 | A * | 9/2000 | Finnegan | A62C 31/02 | 169/56 |
| 6,152,236 | A * | 11/2000 | Retzloff | A62C 37/14 | 169/56 |
| 6,367,559 | B1 * | 4/2002 | Winebrenner | A62C 37/11 | 239/524 |
| 6,374,920 | B1 * | 4/2002 | Phillips | A62C 31/02 | 239/524 |
| 6,729,558 | B1 | 5/2004 | Seenauth | | |
| 6,799,639 | B2 * | 10/2004 | Sato | A62C 31/02 | 239/521 |
| 7,784,555 | B2 * | 8/2010 | Pahila | A62C 37/14 | 169/42 |
| 8,573,316 | B2 * | 11/2013 | Polan | A62C 31/02 | 169/37 |
| 9,089,729 | B2 * | 7/2015 | Almeida | B05B 1/265 | |
| 9,248,327 | B2 * | 2/2016 | Polan | A62C 31/02 | |
| 9,931,528 | B2 * | 4/2018 | Abels | A62C 37/12 | |
| 10,046,190 | B2 * | 8/2018 | Polan | A62C 37/12 | |
| 10,743,459 | B2 | 8/2020 | Rosenbaum et al. | | |
| D902,349 | S | 11/2020 | Gutekunst et al. | | |
| 10,830,361 | B1 | 11/2020 | Wu | | |
| 10,843,209 | B1 * | 11/2020 | Hackett | B05B 1/267 | |
| 10,940,347 | B2 * | 3/2021 | Oldham | B05B 1/267 | |
| 10,981,697 | B1 | 4/2021 | Jaffa | | |
| 11,027,161 | B2 * | 6/2021 | Meyer | B05B 1/265 | |
| 2002/0056763 | A1 * | 5/2002 | Winebrenner | B05B 1/267 | 239/524 |
| 2005/0067171 | A1 * | 3/2005 | Green | A62C 35/68 | 169/17 |
| 2006/0086510 | A1 * | 4/2006 | Pahila | A62C 37/14 | 169/42 |
| 2006/0102362 | A1 * | 5/2006 | S. Polan | A62C 37/09 | 169/37 |
| 2008/0257564 | A1 * | 10/2008 | Cordell | A62C 35/62 | 169/17 |
| 2010/0230515 | A1 | 9/2010 | Wu | | |
| 2010/0327087 | A1 | 12/2010 | Harris | | |
| 2011/0030977 | A1 * | 2/2011 | Polan | A62C 31/02 | 169/37 |
| 2011/0180277 | A1 * | 7/2011 | Jimenez | A62C 37/11 | 169/37 |
| 2015/0297927 | A1 * | 10/2015 | Pipe | A62C 37/14 | 169/37 |
| 2016/0038777 | A1 * | 2/2016 | Abels | B05B 1/02 | 169/37 |
| 2017/0296852 | A1 * | 10/2017 | Pipe | A62C 37/09 | |
| 2017/0319884 | A1 * | 11/2017 | Oldham | A62C 37/12 | |
| 2019/0200513 | A1 | 7/2019 | Wu | | |
| 2020/0276595 | A1 | 9/2020 | Comstock et al. | | |
| 2020/0290073 | A1 | 9/2020 | Fontaine et al. | | |
| 2020/0331017 | A1 | 10/2020 | Lee | | |
| 2020/0346061 | A1 * | 11/2020 | Meyer | B05B 1/265 | |
| 2020/0386143 | A1 | 12/2020 | Huffman et al. | | |
| 2020/0406080 | A1 * | 12/2020 | Ohkoshi | B05B 15/62 | |
| 2021/0069535 | A1 * | 3/2021 | Hackett | A62C 37/10 | |
| 2021/0244985 | A1 * | 8/2021 | Oldham | B05B 15/16 | |
| 2021/0260422 | A1 * | 8/2021 | Drake | A62C 3/14 | |
| 2021/0308699 | A1 * | 10/2021 | Drake | A62C 31/02 | |

OTHER PUBLICATIONS

International Search Report and Written Opinion on International Application No. PCT/IB2020/058426, mail date Nov. 11, 2020, 14 pages.

Tyco Fire & Building Products, Data Sheet TFP620, Model WS—5.6 K-factor, Specific Application Window Sprinklers, Horizontal and Pendent Vertical Sidewall Jul. 2005, 8 pages.

Tyco Fire Products LP, Model WS Specific Application Window Sprinklers Horizontal and Pendent Vertical Sidewall 5.6 K-factor, 2018, 8 pages.

Tyco Fire Products LP, Model WS Window Sprinklers—Allowing Greater Design Freedom, 2014-2015, 4 pages.

Tyco Fire Protection Products, Data Sheet TFP442, "Rapid Response Series LFII Residential 4.9 K-factor Concealed Pendent Sprinkler Flat Plate, Wet Pipe and Dry Pipe Systems", Feb. 2015, 6 pages.

Tyco Fire Protection Products, Data Sheet TFP620, "Model WS Specific Application Window Sprinklers Horizontal and Pendent Vertical Sidewall 5.6 K-factor", May 2014, 8 pages.

Hudson 19001 4 Gallon NeverPump Bak-Pak Sprayer, Yellow, Jun. 27, 2020, Amazon.com, Jul. 8, 2021, URL: https://www.amazon.com/H U DSON-19001-NeverPump-Bak-Pak-Sprayer/dp/B084DWQTW6/ (1 page).

Husqvarna 4 Gallon Backpack Sprayers, White, Feb. 21, 2019, Amazon.com, Jul. 8, 2021.URL: https://www.amazon.com/dp/B07P11 RRXQ (1 page).

PETRA Tools Battery Backpack Sprayer with Custom Fitted Cart , Apr. 20, 2020, Amazon .com, Jul. 8, 2021, URL: https://www.amazon.com/dp/B086WPRPKX (1 page).

Solo, Inc., Solo 421 20-Pound Capacity Portable Chest-mount Spreader, Oct. 15, 2014, Amazon.com, Jul. 8, 2021; URL: https ://www.amazon.com/Solo-20-Pound-Chest-mount-Comfortable-Cross- shoulder/dp/BOOO BWZDOO (Year: 2014) (1 page).

Hudson 13194 Commercial Bak-Pak Sprayer Jun. 4, 2017, Amazon.com Mar. 27, 2021: URL: https://www.amazon.com/dp/BOOONON M6W/ (Year: 2017).

* cited by examiner

CONCEALED WINDOW SPRINKLER FRAME ARMS AND BODY ORIENTATION

CROSS-REFERENCE TO RELATED PATENT APPLICATIONS

This application is a continuation of U.S. patent application Ser. No. 16/717,347, filed Dec. 17, 2019, which claims the benefit of and priority to U.S. Provisional Application No. 62/899,002, filed on Sep. 11, 2019, which is incorporated herein by reference in its entirety.

BACKGROUND

Buildings and other areas commonly include sprinklers configured to provide fire protection. In the event of a fire, the sprinklers are configured to dispense a fluid so as to suppress or extinguish the fire or to protect building elements from exposure to fire's radiant heat.

SUMMARY

At least one aspect of the present disclosure is a fire exposure protection sprinkler assembly configured to provide fire exposure protection for one or more windows. The fire exposure protection system includes a fire exposure protection sprinkler, a sealing assembly configured to unseal in response to a fire such that fire exposure protection fluid may flow from the fire exposure protection sprinkler, a housing comprising a pair of legs, with each of the legs comprising an aperture, and a deflection assembly configured to extend from the housing due to gravity and activation of a cover plate, with a deflector configured to disperse the fire exposure protection fluid over the one or more windows so as to wet the one or more windows.

Another aspect of the present disclosure includes the fire exposure protection sprinkler spraying fire exposure protection fluid in the direction of the window(s) assembly. The fire exposure protection fluid is sprayed in a pattern in the direction of the window and sufficiently wets the window assembly with fire exposure protection fluid for a minimum distance of the sprinkler's stated spacing coverage. The window(s) surfaces are wetted sufficiently to protect the window. The wetted surface of the window protects the window from a fire's radiant heat and allows for heat-strengthened and/or tempered glass to be used in place of fire rated glass.

Another aspect of the present disclosure includes the fire exposure protection sprinkler being a concealed sprinkler configured within a recess of a ceiling.

Another aspect of the present disclosure includes the ceiling in which the fire exposure protection sprinkler is configured being flush with the top of the one or more windows or above the one or more windows.

Another aspect of the present disclosure includes the deflection assembly configured to extend below the ceiling upon the activation of the cover plate.

Another aspect of the present disclosure includes the deflector having the deflector having a first surface configured to receive the fire exposure protection fluid from the fluid supply line, a back wall adjacent the first surface, with the first surface extending from a base of the back wall, and a pair of arms extending laterally from opposite sides of the back wall comprising a pair of bends and partially surrounding the first surface, wherein the back wall and the pair of arms are configured to direct the fire exposure protection fluid to the one or more windows.

Another aspect of the present disclosure includes the pair of arms having one or more bends configured to direct fire exposure protection fluid downward.

Another aspect of the present disclosure includes each of the guide pins have a substantially cylindrical geometry and the apertures of the housing have a geometry configured to accommodate and permit movement of the each of the guide pins along a central longitudinal axis of each of the apertures.

Another aspect of the present disclosure includes each of the guide pins having a head configured opposite the guide pins from the deflector, wherein the head of each of the guide pins has a diameter greater than the diameter of the apertures of the housing.

Another aspect of the present disclosure includes a conical component configured on the first surface and adjacent the back wall of the deflector such that an angled portion of the conical component is directed in a direction opposite the back wall.

Another aspect of the present disclosure includes the fire exposure protection system rated for a K-factor of 5.6 $gpm/psi^{1/2}$ or less.

Another aspect of the present disclosure includes the fire exposure protection sprinkler rated for a flow rate of 20 GPM or lower.

Another aspect of the present disclosure includes the fire exposure protection sprinkler configured to have a spacing of 6-8 ft. when installed.

Another aspect of the present disclosure includes the fire exposure protection sprinkler rated for a response time index of 100 $(ms)^{1/2}$ or lower.

Another aspect of the present disclosure includes the first surface having a projection of an orifice of the fire exposure protection sprinkler and the back wall positioned no more than 0.25 inches from a tangential edge of the projection of the orifice, wherein the orifice is configured to discharge fire exposure protection fluid.

Another aspect of the present disclosure includes the projection of the orifice having a center point and the back wall positioned no more than 0.5 inches from the center point.

Another aspect of the present disclosure includes a pair of guide pins, wherein each of the guide pins have a substantially cylindrical geometry and the apertures of the legs have a geometry configured to accommodate and permit movement of the each of the guide pins along a central longitudinal axis of each of the apertures.

Another aspect of the present disclosure includes each of the guide pins having a head configured opposite the guide pins from the deflector, wherein the head of each of the guide pins has a diameter greater than the diameter of the apertures of the housing.

Another aspect of the present disclosure includes the fire exposure protection sprinkler assembly implemented in conjunction with a fixed glazed window assembly, wherein the fixed glazed window assembly includes ceramic, tempered, or heat strengthened glass.

Another aspect of the present disclosure includes the fire exposure protection sprinkler assembly configured to increase a fire resistance rating of a window or wall assembly by protecting the window or wall assembly from indirect or direct exposure to a fire.

Another aspect of the present disclosure includes the fire exposure protection sprinkler assembly configured to provide a consistent spray distribution for an entirety of a time frame for which the fire exposure protection sprinkler is rated.

Another aspect of the present disclosure includes the fire exposure protection sprinkler assembly configured to provide a uniform spray pattern of 180 degrees or less in a direction of the window or wall assembly.

Another aspect of the present disclosure includes the fire exposure protection sprinkler assembly configured to wet a surface of the window or wall assembly from a top of an intended area to a bottom of the intended area.

Another aspect of the present disclosure includes the fire exposure protection sprinkler assembly configured to provide protection for the window or wall assembly protect the window or wall assembly by limiting a rate of heat transfer to and through a glazing of the window or wall assembly by wetting a surface of the glazing.

Another aspect of the present disclosure includes the glazing including ceramic glass, heat strengthened glass, or tempered glass.

Another aspect of the present disclosure includes the window or wall assembly having glazing, framing, silicone sealant, elastomeric seals, or vertical separations.

Another aspect of the present disclosure includes the window or wall assembly has a height of no greater than 13 ft.

Another aspect of the present disclosure includes the fire exposure protection sprinkler assembly configured to provide an active fire system for an area.

Another aspect of the present disclosure includes the fire exposure protection sprinkler assembly configured to provide protection for opposite sides of a hallway having substantially parallel walls, wherein the fire exposure protection sprinkler assembly is arranged in the hallway between the substantially parallel walls.

Another aspect of the present disclosure includes a fire sprinkler assembly arranged within a recess of a ceiling and configured to provide fire exposure protection for one or more windows. The fire exposure protection sprinkler assembly includes a fire sprinkler, a fluid supply line configured to provide fire exposure protection fluid to the fire exposure protection sprinkler, a sealing assembly configured to unseal in response to a fire such that fire exposure protection fluid may flow from the fire exposure protection sprinkler, a housing having a pair of legs, with each of the legs comprising an aperture, and a deflection assembly having a pair of guide pins rigidly coupled to a deflector, wherein the deflector is configured to deploy from the housing upon displacement of a cover plate of the recess such that the deflector extends from the recess below the housing.

Another aspect of the present disclosure includes the deflector having a first surface configured to receive the fire exposure protection fluid from the fluid supply line, a back wall adjacent the first surface, with the first surface extending from a base of the back wall, and a pair of arms extending laterally from opposite sides of the back wall comprising a pair of bends and partially surrounding the first surface, wherein the back wall and the pair of arms are configured to direct the fire exposure protection fluid to the one or more windows.

Another aspect of the present disclosure includes the pair of arms having one or more bends configured to direct fire exposure protection fluid downward.

Another aspect of the present disclosure includes each of the guide pins having a head configured opposite the guide pins from the deflector, wherein the head of each of the guide pins has a diameter greater than the diameter of the apertures of the housing.

Another aspect of the present disclosure includes a fire sprinkler assembly arranged within a recess of a ceiling and configured to provide fire exposure protection for one or more windows. The fire exposure protection sprinkler assembly includes a fire sprinkler, a housing having a pair of legs, with each of the legs having an aperture, and a deflection assembly having a pair of guide pins rigidly coupled to a deflector and configured to deploy from the housing upon displacement of a cover plate of the recess such that the deflector extends from the recess below the housing, wherein the deflector has a pair of arms extending laterally therefrom and defining an area of less than 180 degrees.

Another aspect of the present disclosure includes the sprinkler assembly coupled to a fluid supply line configured to supply fire exposure protection fluid to the fire sprinkler such that the fire exposure protection fluid may be dispensed upon activation of a sealing assembly of the fire sprinkler assembly.

Another aspect of the present disclosure includes the deflector configured to receive a flow of the fire exposure protection fluid upon activation of the sealing assembly and disperse the fire exposure protection fluid over one or more windows such that the one or more windows comprise a wetted surface.

DETAILED DESCRIPTION

Figure 1:
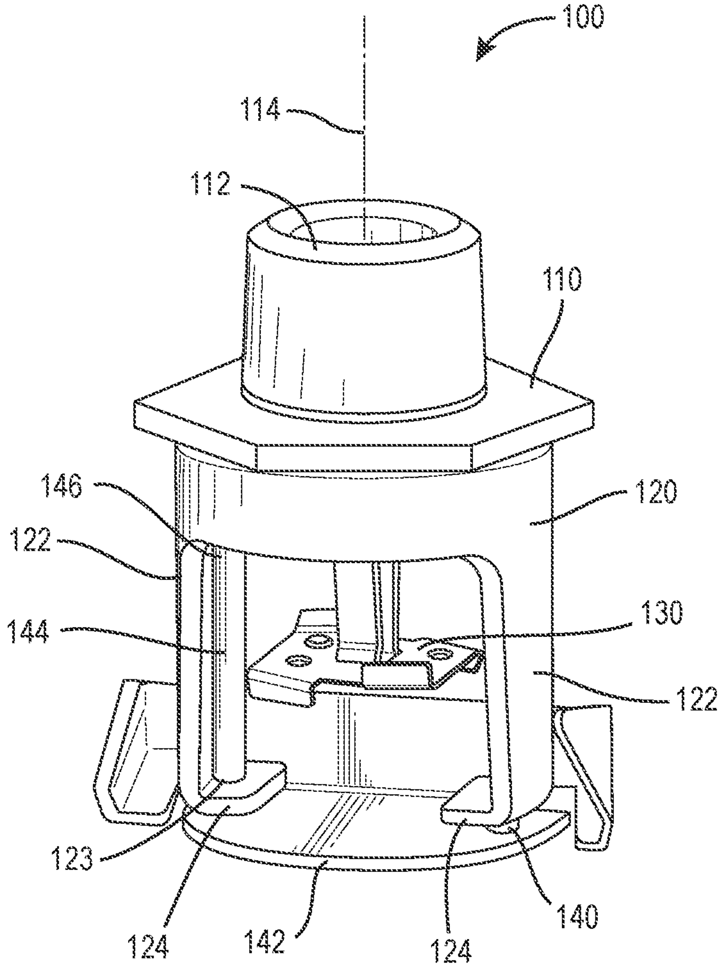
FIG. 1 is a perspective view of a concealed sprinkler assembly in an inactivated position, according to an example implementation.

Before turning to the figures, which illustrate certain examples, it is noted that the present disclosure is not limited to the details or methodology set forth in the description or illustrated in the figures. The terminology used herein is for the purpose of description only and should not be regarded as limiting.

The present disclosure generally refers to a deflector for a sprinkler. The present disclosure refers to a deflector configured to disperse water from a sprinkler over a desired window or windows.

Referring generally to the figures, fire exposure protection systems include sprinklers which are configured to inhibit or permit flow of fluid (typically water, but also in some applications fire suppressant fluid) depending upon conditions. In the instance of a fire, the sprinklers are configured to permit the flow of fluid such that the fluid may contact a deflector and be dispersed so as to provide exposure protection to a window or windows. For some windows, the sprinklers may be configured to disperse water or fire exposure protection fluid over a window or windows. In order to accomplish fire exposure protection for a given window or windows, sprinklers can include components configured to direct and deflect water or fire exposure protection fluid accordingly. For example, if a sprinkler were configured to provide fire exposure protection for a window, then the sprinkler may include components configured to deflect fire exposure protection fluid 180° over the given window surface or surfaces.

In some examples, it may be desired to conceal a sprinkler within a ceiling, with the sprinkler still capable of and configured to activate and disperse water or fire suppressant fluid in the instance of a fire (e.g., concealed sprinklers). Such installations of concealed sprinklers may include a cover plate shielding the sprinkler from view under circumstances that do not involve a fire. Given that concealed sprinklers may be configured within a recess of a ceiling or other structure, the sprinkler may not be able to provide fire exposure protection for a desired window or windows from the recessed position within the ceiling or wall. Accordingly, concealed sprinklers may require additional components configured within the recess with the sprinkler that, upon activation of the concealed sprinkler, extend from the recess and deflect fire exposure protection fluid in one or more directions so as to provide fire exposure protection coverage for a window or windows. For example, a concealed sprinkler may be configured within a ceiling with said sprinkler responsible for providing fire exposure protection for a portion of a glass window. Fire exposure protection fluid would only be dispersed over a limited area if directed straight from the fluid supply line to the sprinkler within the recess (e.g., the fire exposure protection fluid would flow substantially downward and would not reach the wall and/or windows). In order to direct fire exposure protection fluid to the wall, the sprinkler may include a deflector that, upon activation of the cover plate (e.g., caused by detection of a fire), extends from the recess of the sprinkler and is configured to deflect the fire exposure protection fluid toward the glass window so as to provide fire exposure protection coverage for the window or windows from the recessed location of the sprinkler.

In some examples, one or more concealed sprinklers may be implemented in conjunction with a fixed glazed window assembly. Such a window assembly may include a window that includes ceramic, tempered, or heat strengthened glass and, in conjunction with the one or more concealed fire sprinklers, provides an alternative to a fire-resistance-rated non-load-bearing interior fire partition, fire barrier, or exterior wall assembly. Concealed fire sprinklers can increase a fire resistance rating of a window and/or wall assembly, as the concealed fire sprinklers ca be configured to provide protection to the window and/or wall assembly from direct or indirect exposure to a fire. When activated, the concealed fire sprinklers provide protection for the wall or window and/or wall assembly by wetting the surface (typically a glazed surface) of the window and/or wall assembly so as to limit the rate of heat transfer to and through the window and/or wall assembly. In some examples, concealed fire sprinklers can be configured relative to a window and/or wall assembly to provide an active fire system as an alternative to a passive fire system (e.g., fire partitions, fire barriers, fire walls, etc.). In some applications, passive fire systems are costly and can be ineffective under certain circumstances and, accordingly, concealed fire sprinklers implemented in conjunction with a window and/or wall assembly is desirable.

Figure 2:
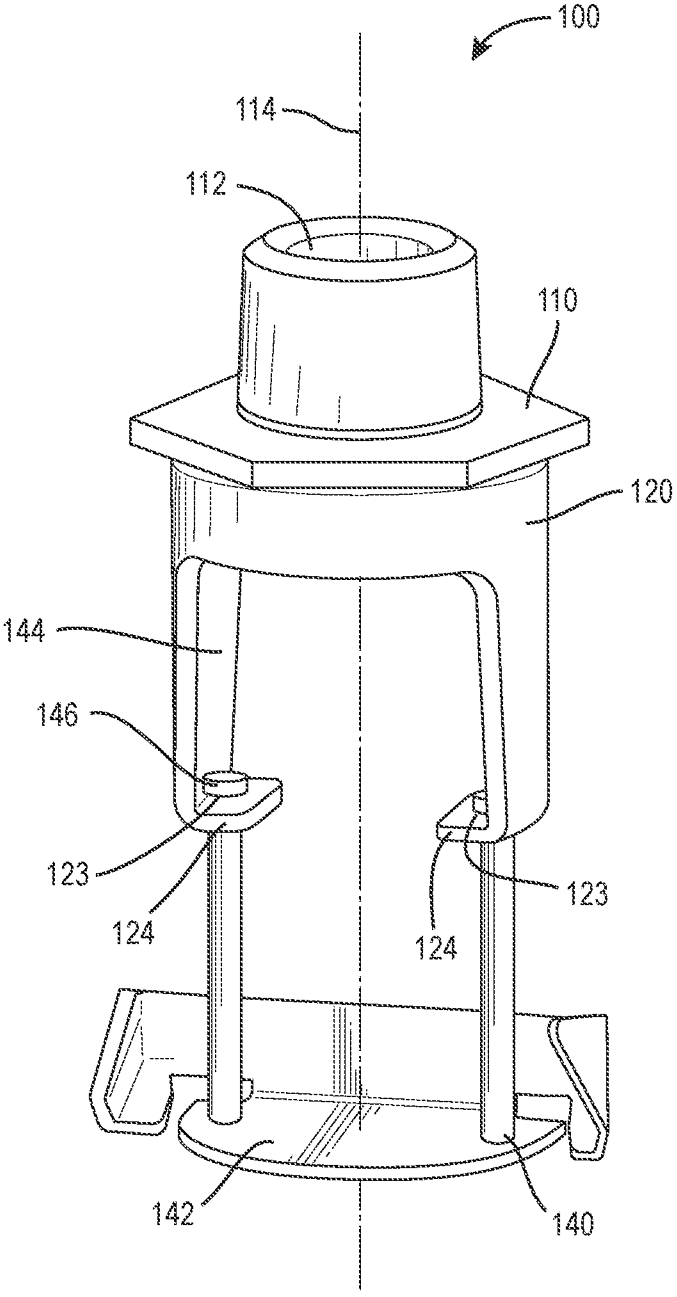
FIG. 2 is a perspective view of the concealed sprinkler assembly of FIG. 1 in an activated position, according to an example implementation.
Figure 3:
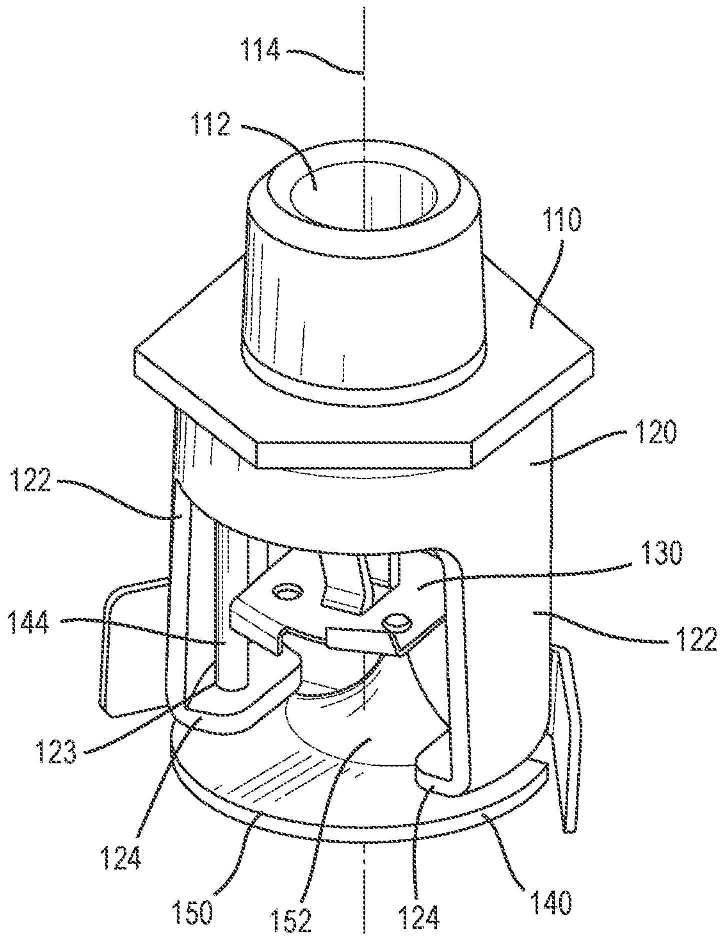
FIG. 3 is a perspective view of another aspect of a concealed sprinkler assembly in an inactivated position, according to an example implementation.
Figure 4:
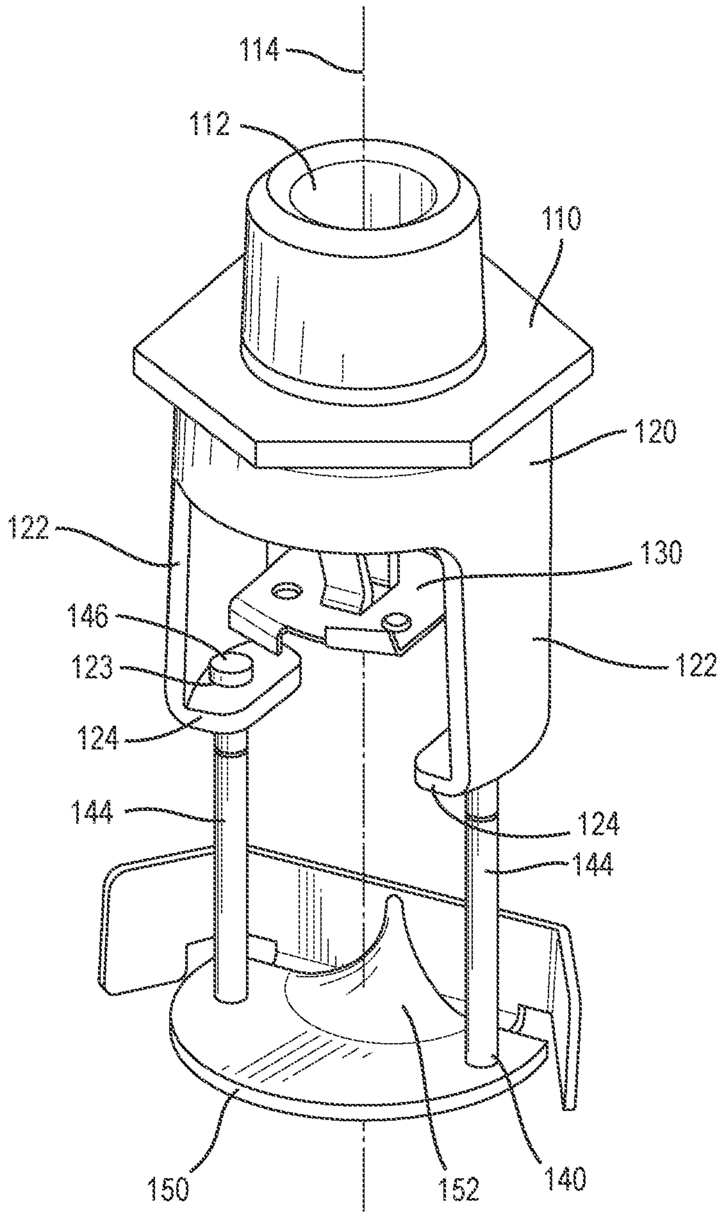
FIG. 4 is a perspective view of the concealed sprinkler assembly of FIG. 3 in a deployed position, according to an example implementation.

Referring now to FIGS. 1-4, a concealed sprinkler assembly is shown. In FIGS. 1 and 3, the concealed sprinkler assembly 100 is shown in an inactivated position, while in FIGS. 2 and 4 the concealed sprinkler assembly 100 is shown in a deployed position. With respect to FIGS. 1 and 3 and the inactivated position of the concealed sprinkler assembly 100, the inactivated position may correspond to the disposition of the concealed sprinkler assembly 100 within a recess of ceiling or other structure. In some aspects, the concealed sprinkler assembly 100 may be further concealed within a recess of a wall or ceiling by a plate or other component configured to cover the recess. When the concealed sprinkler assembly 100 is deployed (and thus transitions from the inactivated position as shown in FIGS. 1 and 3 to the deployed position as shown in FIGS. 2 and 4), the concealed sprinkler assembly 100 is configured to extend from the recess in which it is disposed after a plate or other component covering the recess has been displaced. One or more thermal elements of the concealed sprinkler assembly 100 may activate, thus permitting fire exposure protection fluid to flow. As fire exposure protection fluid flows from a fluid supply line (not shown in figures) to the concealed sprinkler assembly 100, the fire exposure protection fluid contacts the one or more components extending from the recess, with the fire exposure protection fluid being deflected in a desired direction in order to provide fire exposure protection for a given window or windows.

In some aspects, the deployment and activation of the concealed sprinkler assembly 100 may include a fire causing components within the concealed sprinkler assembly 100 and/or components within or adjacent the recess in which the concealed sprinkler assembly 100 is disposed to initiate the activation process. For example, a plate or other covering of the recess may be displaced, thus permitting components of the concealed sprinkler assembly 100 to extend below the recess, with the concealed sprinkler assembly 100 transitioning to a deployed position. A fire within a given area may cause one or more thermal elements of the concealed sprinkler assembly 100 to activate which may accordingly permit the flow of fire exposure protection fluid from the concealed sprinkler assembly 100. In some aspects the activation of the thermal elements may include a link melting, thus permitting the flow of a fire exposure protection fluid from the fluid supply line and to the concealed sprinkler assembly 100. Accordingly, the flow of the fire exposure protection fluid may contact one or more components of the concealed sprinkler assembly 100 (for example, components of the concealed sprinkler assembly 100 deployed and extending below the recess) causing the fire exposure protection fluid to be dispersed over one or more windows.

The concealed sprinkler assembly 100 is shown to include a mount 110, with the mount 110 defining an opening 112. In some aspects, the opening 112 may be of a cylindrical geometry, and may extend into and/or through the mount along a central axis 114. The opening 112 of the mount 110 may be configured to receive fire exposure protection fluid, according to some aspects. The mount 110 may also be configured to couple with a fluid supply line or other supply means such that fire exposure protection fluid may reach the concealed sprinkler assembly 100. The mount 110 may also have various geometries according to some aspects, with the various geometries configured such that the mount, and subsequently the concealed sprinkler assembly 100 may be accommodated by various recesses. For example, the opening 112 of the mount 110 may be configured in different sizes or geometries so as to accommodate various fire exposure protection fluid flow or coupling to various fluid supply lines depending on space constraints within a recess or other concealed space.

The mount 110 is further shown to include a sealing assembly 130, as shown in FIGS. 1, 3, and 4. In some aspects, the sealing assembly may include a portion of the mount 110, and may also include other components coupled to said portion of the mount 110. For example, in some aspects the sealing assembly may include one or more of a spring, a button, a set screw, and levers. In some aspects, such components may be configured at least partially within the opening of the concealed sprinkler assembly 100. Additionally, the sealing assembly 130 may be configured to have a geometry that may be accommodated by components of the concealed sprinkler assembly 100 and/or the recess in which the concealed sprinkler assembly 100 is configured. For example, the sealing assembly 130 may be configured such that it is contained within the footprint of the mount 110 so as to maximize special efficiency of the recess and the concealed sprinkler assembly 100 thereof. The sealing assembly 130 can be configured to activate the concealed sprinkler assembly 100 (e.g., become unsealed or rupture) upon detection of a fire or other initiation means such as activation of an alarm system. For example, upon the sealing assembly becoming unsealed by way of rupture, melting, or other possible processes, fire exposure protection fluid may begin to flow from the fluid supply line and thus contact a portion of the concealed sprinkler assembly 100 configured to extend beyond the recess. The contact of the fire exposure protection fluid with said portion of the concealed sprinkler assembly 100 may initiate the movement of the portion of the concealed sprinkler assembly 100 beyond the recess, and thus begin directing the fire exposure protection fluid to a desired window or windows. Additionally, in some aspects the portion of the concealed sprinkler assembly 100 extending beyond the recess may be in such a position prior to receiving the fire exposure protection fluid.

The mount 110 is shown to be coupled to a housing 120, with an upper portion of the housing 120 coupled to a lower portion of the mount 110 (the lower portion of the mount 110 being opposite the mount 110 from the portion that can be configured to couple with a fluid supply line or other components). The housing 120 is configured to have an opening (not shown) with a geometry the same as or similar to the opening 112 of the mount 110 such that at least a portion of the mount 110 may extend into and/or through the opening of the housing. For example, in some aspects, a portion of the mount 110 may include components of the sealing assembly 130, and as mentioned previously may be configured within the footprint of the mount 110 (e.g., as the sealing assembly 130 is shown in FIGS. 1, 3, and 4) which may be configured within the opening of the housing 120. Additionally, in some aspects the sealing assembly 130 may be configured to decouple from the concealed sprinkler assembly 100 upon activation such that the sealing assembly 130 is discharged from the recess, along with any plate configured to cover the recess and the concealed sprinkler assembly 100 when in the inactivated position as shown and described previously.

The housing 120 is shown to include a pair of legs 122 extending in a direction opposite that of the housing 120 that is engaged to couple with the mount 110. As shown and described, the legs 122 are configured substantially opposite the housing 120 from one another (e.g., 180° opposite the housing one another). However, in some aspects the legs 122 may be configured alternatively such that the concealed sprinkler assembly 100 may have a size and geometry compatible with a recess or other concealed space. Each of the legs 122 is shown to have a foot 124 (also referred to as feet 124) with one foot 124 arranged at the proximal end of each leg 122. The feet 124 are configured substantially perpendicular to the legs 122, with the feet 124 extending toward the central axis 114 of the concealed sprinkler assembly 100 (e.g., the feet extend substantially toward the opposite leg 122 and foot 124). In some aspects, the feet 124 and the legs 122 from which the feet 124 extend may have alternate configurations and/or geometries. For example, the feet 124 may be configured such that fire exposure protection fluid dispensed by the concealed sprinkler assembly 100 does not contact the legs 122 or the feet 124. Additionally, the legs 122 and the feet 124 may be sized and have geometries configured so as to accommodate and function cooperatively with additional components of the concealed sprinkler assembly 100 as shown and subsequently described.

Each of the feet 124 are shown to include an aperture 123, with the aperture 123 configured in a substantially central portion of the feet 124. The apertures 123 of the feet 124 are shown to have a substantially circular geometry, but may also have alternative geometries in some examples. The apertures 123 are shown to retain guide pins 144, with each aperture 123 configured to retain one guide pin 144. The apertures 123 and guide pins 144 are sized such that linear movement of the guide pins 144 is permitted within the apertures 123, with the linear movement such that the guide pins 144 extend substantially straight as movement of the guide pins 144 occurs while retained by the apertures 123. As described previously, movement of the guide pins 144 within the apertures 123 may be driven by activation of the cover plate concealing the recess in which the concealed sprinkler assembly 100 is arranged. Such activation of the concealed sprinkler assembly 100 may include a mechanical release in which components are decoupled such that movement of the guide pins 144 is permitted within the apertures 123, or may include components of the concealed sprinkler assembly 100 contacted by a flow of fire exposure protection fluid. In some aspects, the length and thickness of the guide pins 144 may vary according to various aspects of the concealed sprinkler assembly 100 and the recess in which the concealed sprinkler assembly 100 is disposed, such as longer guide pins 144 implemented for a deeper recess.

Each of the guide pins 144 is shown to include a head 146, with the head having a size and geometry such that movement of the head 146 through the apertures 123 is not mechanically permitted. In some aspects, the head 146 of the guide pins 144 is configured such that the head 146 has a greater diameter than other portions of the guide pins 144 that of a size that movement thereof is permitted within the apertures 123. Accordingly, the head 146 of each of the guide pins 144 defines the deployed position of the concealed sprinkler assembly 100, which includes the guide pins 144 extending from the apertures 123 as far as mechanically permitted. The deployed position is thus defined as the guide pins 144 positioned such that the head 146 of each of the guide pins 144 contacts the feet 124 of the housing 120 such that no further movement of the guide pins 144 in the direction opposite the mount 110 is permitted. The guide pins 144 are coupled to a deflector 142, and as shown in FIGS. 1-4 are coupled to a top surface 140 of the deflector 142.

The deflector 142 is configured to define the inactivated position of the concealed sprinkler assembly 100 (e.g., opposite the head 146 of the guide pins 144), as shown in FIGS. 1 and 3. While the head 146 of each of the guide pins 144 defines the deployed position of the concealed sprinkler assembly 100 in which the deflector 142 is positioned such that it extends from the housing 120, the top of the head 146 defines the inactivated position of the concealed sprinkler assembly 100 such that contact between the top surface of the head 146 and the mount 110 prevents further movement of the guide pins 144 within the apertures 123 toward the mount 110. Accordingly, the concealed sprinkler assembly 100 is considered to be in the inactivated position (FIGS. 1 and 3) when the deflector 142 is positioned such that the top of the head 146 contacts the mount 110, thus preventing further upward movement of the deflector 142.

Upon deployment of the concealed sprinkler assembly 100, the deflector 142 is configured to transition from the retracted position of the inactivated position (FIGS. 1 and 3) to the extended position of the deployed position (FIGS. 2 and 4) with such transition facilitated by movement of the guide pins 144 within the apertures 123. The transition from the retracted state of the inactivated position to the extended state of the deployed position further includes the top surface of the head 146 contacting a portion of the mount 110, with the deflector 142 moving in a direction opposite the mount 110 as the guide pins 144 move within the apertures 123 until the head 146 of each of the guide pins 144 contacts the feet 124 thus defining the deployed position of the concealed sprinkler assembly 100. As described previously, movement of the deflector 142 in the direction opposite the mount upon deployment of the concealed sprinkler assembly 100 may be driven by a mechanical release or decoupling of the covering of the recess (e.g., the melting of a link as caused by increased temperature of a fire) from the recess in which the concealed sprinkler assembly 100 is arranged. The concealed sprinkler assembly 100 becomes activated upon the unsealing of the sealing assembly 130 and the flow of fire exposure protection fluid permitted by the unsealed sealing assembly. The flow of the fire exposure protection fluid may then flow from the concealed sprinkler assembly 100 and components thereof, for example contacting the top surface 140 of the deflector 142 in the deployed position (FIGS. 2 and 4) with the fluid flow dispersed over one or more windows.

Concealed fire exposure protection devices such as the concealed sprinkler assembly 100 are desirable within buildings as the concealed design allows for a preferred appearance of an area and also maximizes spatial efficiency for said area. However, concealed sprinklers permanently configured and confined within a recess of a ceiling are limited and inhibited in fluid dispersal by the recessed position. For example, while fire exposure protection fluid would be permitted to flow directly downward from a concealed sprinkler arranged within a recess of a ceiling, fire exposure protection fluid would not be dispersed to provide fire exposure protection extending much beyond the footprint of the recess in which the concealed sprinkler is arranged. Accordingly, windows which are not configured directly beneath the recess accommodating such a concealed sprinkler would require other means in order to have fire exposure protection coverage.

In the deployed position as shown and described with reference to FIGS. 2 and 4, the deflector 142 is configured to extend from the recess in which the concealed sprinkler assembly 100 is configured. For example, if the concealed sprinkler assembly 100 is configured within a recess in a ceiling, the deployed position includes the deflector extending from the concealed sprinkler assembly 100 below the surface of the ceiling. Accordingly, in activation of the concealed sprinkler assembly 100, the sealing assembly 130 is configured to unseal (for example, decouple, rupture, or melt due to heat exposure) such that the flow of fire exposure protection fluid from the fluid supply line is permitted. The flow of the fire exposure protection fluid is configured to proceed along the central axis 114. For example, if the concealed sprinkler assembly 100 is configured vertically within a recess of a ceiling, the unsealing of the sealing assembly 130 would permit the flow of fire exposure protection fluid in a substantially vertical direction moving from the mount 110 (with the mount 110 and/or the opening 112 thereof coupled to and/or otherwise accommodating the fluid supply line) toward the deflector 142, with the deflector 142 configured below the concealed sprinkler assembly 100 and extending from the recess (as shown and described in FIGS. 2 and 4 with reference to the deployed position of the concealed sprinkler assembly 100).

The flow of fire exposure protection fluid along the central axis 114 is configured to contact the top surface 140 of the deflector 142, with the origin of the flow within the recess (e.g., the coupling point of the concealed sprinkler assembly 100 with the fluid supply line) and the flow proceeding along the central axis 114 from within the recess to beyond the recess, where the flow contacts the top surface of the deflector 142. The flow of the fire exposure protection fluid, upon contact with the top surface 140 of the deflector 142, is dispersed so as to provide fire exposure protection for one or more windows. The dispersal of the fire exposure protection fluid by the deflector 142 is dependent upon the pressure and velocity of the flow of the fire exposure protection fluid as well as the geometry of the deflector 142. Generally, the deflector 142 is configured with the top surface 140 at an oblique angle relative to the central axis 114, for example approximately 74 degrees (and the direction of the flow of the fire exposure protection fluid). However, in some aspects, the angle between the top surface 140 and the central axis 114 may be substantially perpendicular. The geometry of the deflector 142 determines the dispersal of the fire exposure protection fluid for one or more windows. For example, in some aspects the deflector 142 may be configured to deflect and ultimately disperse the fire exposure protection fluid to a wall and/or a window therein. In such an example, the wall and/or window is not within the footprint of the recess accommodating the concealed sprinkler assembly 100, and thus direct flow of fire exposure protection fluid from the concealed sprinkler assembly 100 within the recess would not be dispersed to the wall and/or window without deflection via the deflector 142.

As shown in FIGS. 1-2 and FIGS. 3-4, the deflector 142 may have various geometries in order to provide fire exposure protection (via dispersal of fire exposure protection fluid) to different windows. As shown in FIGS. 1-2, the top surface 140 of the deflector 142 is substantially flat and forms an approximately 90° angle with a back wall of the deflector 142. Such an angle may be configured to prevent fire exposure protection fluid from being dispersed in the direction of the back wall, with the dispersal of the fire exposure protection fluid contained to the protected window or windows in front of the sprinkler assembly. Conversely, as shown in FIGS. 3-4, the top surface 140 of the deflector 142 is not substantially flat as that of the deflector 142 of FIGS. 1-2. The top surface 140 of the deflector 142 is shown to have a curved transition 152 to the back wall of the deflector 142 as opposed to the substantially 90° angle of FIGS. 1-2. Such a curved transition 152 of the deflector 142 may disperse fire exposure protection fluid over a different window or windows, for example a larger or differently configured window than such a window as would be provided fire exposure protection coverage by the geometry of the deflector 142 of FIGS. 1-2.

As shown and subsequently described, the deflector 142 as shown in FIGS. 1-4 may have additional components as well as alternative geometries as shown in FIGS. 5-13 in order to disperse fire exposure protection fluid for a given window or windows and ultimately provide fire exposure protection for such a window or windows. Such additional components and geometries may include lateral components and various angles so as to deflect and disperse fire exposure protection fluid to different a window or window positioned in various directions relative to the deflector 142. For example, the deflector 142 may include horizontally and/or laterally bent features configured to prevent fire exposure protection fluid from being dispersed 180 degrees from the central axis 114. The horizontal and/or lateral bends may include additional bends to prevent the dispersal of fire exposure protection fluid upwards. Further to the previous example, the horizontally and/or laterally bent features may include corners configured approximately on the same plane as the top surface 140 of the deflector 142 so as to prevent fire exposure protection fluid from being dispersed 180 degrees about the central axis 114.

The concealed sprinkler assembly 100 may also be configured to be installed in various spaces and may have various ratings and parameters corresponding to the installation and user thereof. For example, the concealed sprinkler assembly 100 may be configured to have a K-factor of 5.6 gpm/psi$^{1/2}$ or lower. Additionally, the concealed sprinkler assembly 100 may be rated to accommodate a flow rate of 20 GPM or lower, for example for the flow of fire exposure protection fluid. The concealed sprinkler assembly 100 may also include a response time index of 100 (ms)$^{1/2}$ or lower. Additionally, the concealed sprinkler assembly 100 may include parameters corresponding to installation and spacing upon installation. For example, the concealed sprinkler assembly 100 may be configured to have a spacing of 6-8 ft. for a minimum flow of 20 GPM, and/or may be configured to have a spacing less than 6 ft. for a minimum flow of 15 GPM. The concealed sprinkler assembly 100 may also be configured to accommodate a maximum pressure of 175 psi per sprinkler.

Figure 5:
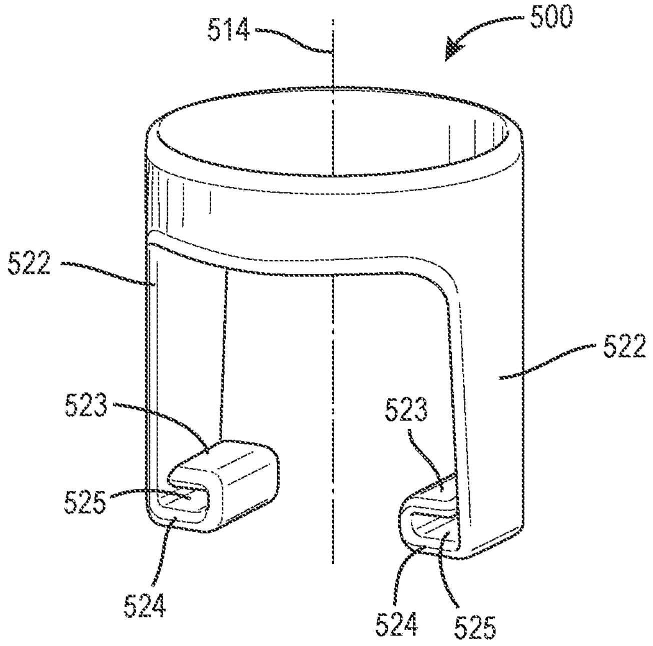
FIG. 5 is a perspective view of a housing for a concealed sprinkler assembly, according to an example implementation.

Referring now to FIG. 5, an alternate housing 500 is shown. The housing 500 is shown to have a structure similar to that of the housing 120, with a pair of legs 522 configured substantially 180° opposite each other. The housing 500 is shown to be configured about a central axis 514, and may be coupled to a mount similar to the mount 110 of FIGS. 1-4 for implementation with a system the same as or similar to the concealed sprinkler assembly 100. Contrary to the housing 120, the housing 500 includes a pair of feet 524 configured to each have a first aperture 523 and a second aperture 525, with the first aperture 523 and the second aperture 525 of each foot 524 centered about central axes (e.g., guide pins such as the guide pins 144 of FIGS. 1-4 may be retained simultaneously within the first aperture 523 and the second aperture 525 of each foot 524, with the guide pins in an orientation substantially parallel the central axis 514 such as in FIGS. 1-4).

The addition of the second apertures 525 to each foot 524 of the housing 500 may reinforce the housing 500. For example, if the housing 500 were to be implemented in conjunction with the concealed sprinkler assembly 100 of FIGS. 1-4, the structure of the housing 500 (primarily the feet 524 and the second apertures 525) may be configured to retain guide pins (such as guide pins 144) and a deflector (such as the deflector 142) as said components are subjected to a greater pressure or volumetric flow of fire exposure protection fluid. Increased pressure or volumetric flow rate of fire exposure protection fluid from a fluid supply line may be necessary in order to provide fire exposure protection and deflect/disperse fire exposure protection fluid over a given window or windows and, accordingly, may require reinforced components such as the housing 500 of FIG. 5. Additionally, the second apertures 525 of the feet 524 may provide orientation stability to both the housing 500 as well as any components that may be coupled thereto (e.g., guide pins, a deflector, etc.). For example, if the housing 500 were implemented as a component of a concealed sprinkler assembly such as the concealed sprinkler assembly 100, the second apertures 525 may increase general stability of the housing 500 and the concealed sprinkler assembly as fire exposure protection flows from the concealed sprinkler assembly and through the housing 500 substantially along the central axis 514.

Referring now to FIGS. 6-11, various examples of deflectors are shown that can be similar in structure and/or function to that of the deflector 142 as shown and described with reference to FIGS. 1-4. As mentioned previously, deflectors such as those in FIGS. 6-11 (which can be implemented with the concealed sprinkler assembly 100 and/or or other similar components) can be configured to have different components and/or geometries so as to provide fire exposure protection via deflection of fire exposure protection fluid for a given window or windows. For example, the deflectors of FIGS. 6-11 all include a top surface similar to that of the deflector 142, with said top surfaces configured to receive a flow of fire exposure protection fluid as described with reference to the concealed sprinkler assembly 100 of FIGS. 1-4. It should be noted that some components of the deflectors shown and described in FIGS. 6-11 may include components and features thereof that are the same as and/or similar to those of the deflector 142 such as, for example, the top surface 140 of the deflector 142. The deflectors of FIGS. 6-11 may also be implemented in conjunction, engaged with, or coupled to one or more of the components of the concealed sprinkler assembly 100 such as, for example, the guide pins 144.

Figure 6:
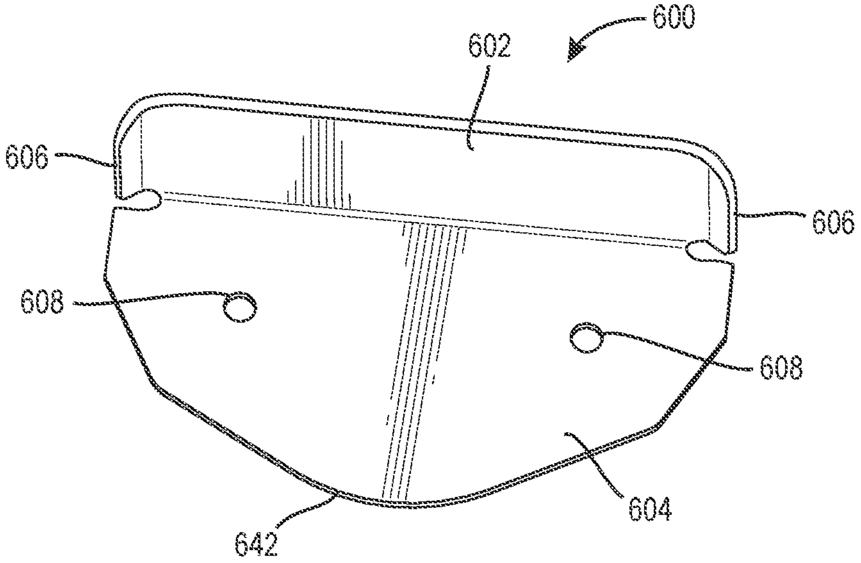
FIG. 6 is a perspective view of a deflector for a concealed sprinkler assembly, according to an example implementation.

Referring now to FIG. 6, a deflector 642 is shown. The deflector 642 is shown to include a back wall 602 configured substantially perpendicular to a top surface 604. The back wall 602 is shown to include a pair of arms 606, with the arms 606 extending laterally from opposite sides of the back wall 602. The arms 606 are configured to extend from the back wall 602 at an acute angle in the direction of the top surface 604 so as to deflect fire exposure protection fluid over a window or windows within an area having a range of less than 180° (with the range defined in combination by the arms 606 and the back wall 602). Additionally, in some aspects, the deflector 642 may include a pair of apertures 608 configured to accommodate coupling to guide pins.

Figure 7:
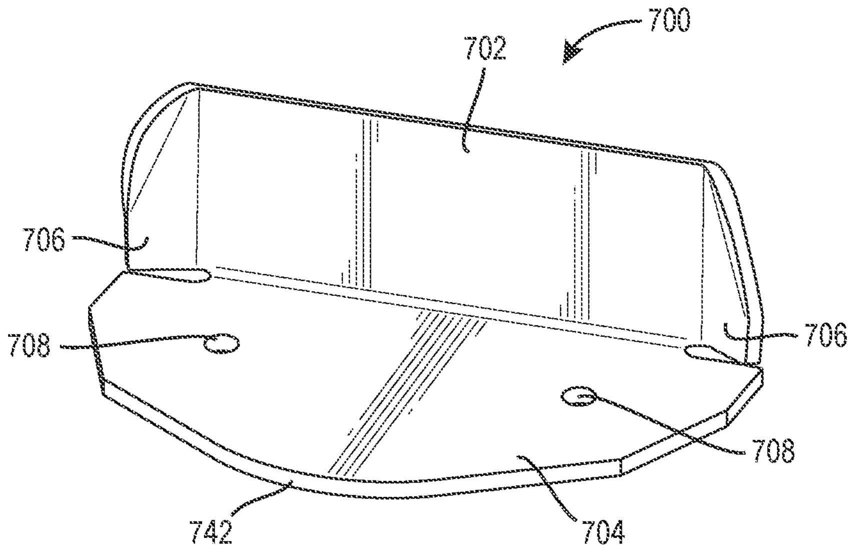
FIG. 7 is a perspective view of another aspect of a deflector for a concealed sprinkler assembly, according to an example implementation.

Referring now to FIG. 7, a deflector 742 is shown. The deflector 742 is shown to include a back wall 702 configured substantially perpendicular to a top surface 704. The back wall 702 is shown to include a pair of arms 706, with the arms 706 extending laterally from opposite sides of the back wall 702. The arms 706 are configured to extend from the back wall 702 at an acute angle in the direction of the top surface 704 at multiple points. That is to say that the arms 706 include multiple angles directing the arms 706 in the direction of the top surface 704. The top surface 704 includes a pair of apertures 708 disposed on substantially opposite sides of the top surface 704. Additionally, in some aspects, the apertures 708 may be configured to accommodate coupling to guide pins.

Figure 8:
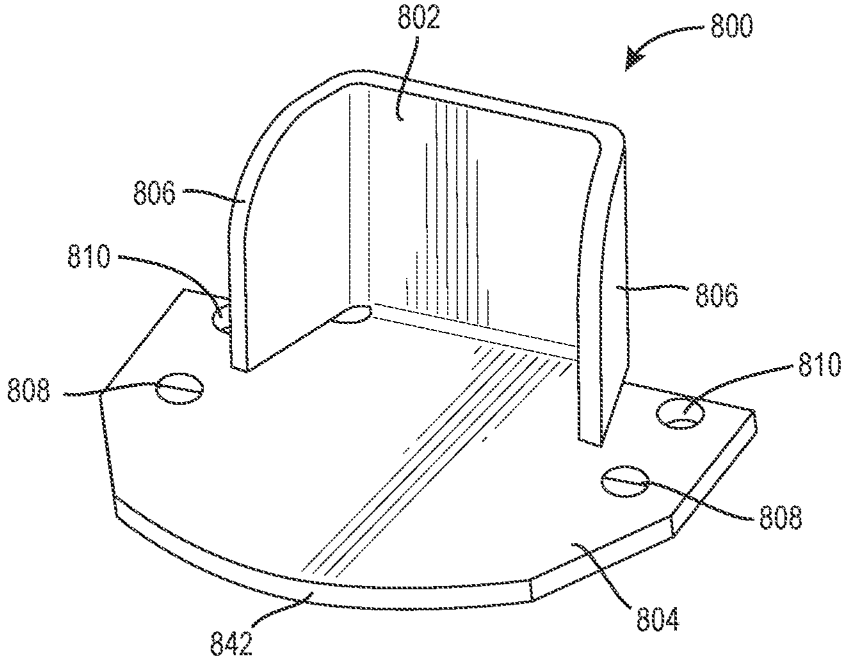
FIG. 8 is a perspective view of another aspect of a deflector for a concealed sprinkler assembly, according to an example implementation.

Referring now to FIG. 8, a deflector 842 is shown. The deflector 842 is shown to include a back wall 802 configured substantially perpendicular to a top surface 804. As opposed to other deflectors shown and described previously, the back wall 802 of the deflector 842 does not span the width of the top surface 804 but only a central portion thereof. The back wall 802 is shown to include a pair of arms 806, with the arms 806 extending laterally from opposite sides of the back wall 802. The arms 806 are configured to extend from the back wall 802 at an acute angle in the direction of the top surface 804 at multiple points. Additionally, the arms 806 are further configured to have a footprint that overlaps that of the top surface 804. The top surface 804 includes a pair of apertures 810 also configured on substantially opposite sides of the top surface. Additionally, in some aspects, the apertures 810 may be configured to accommodate coupling to guide pins.

Figure 9:
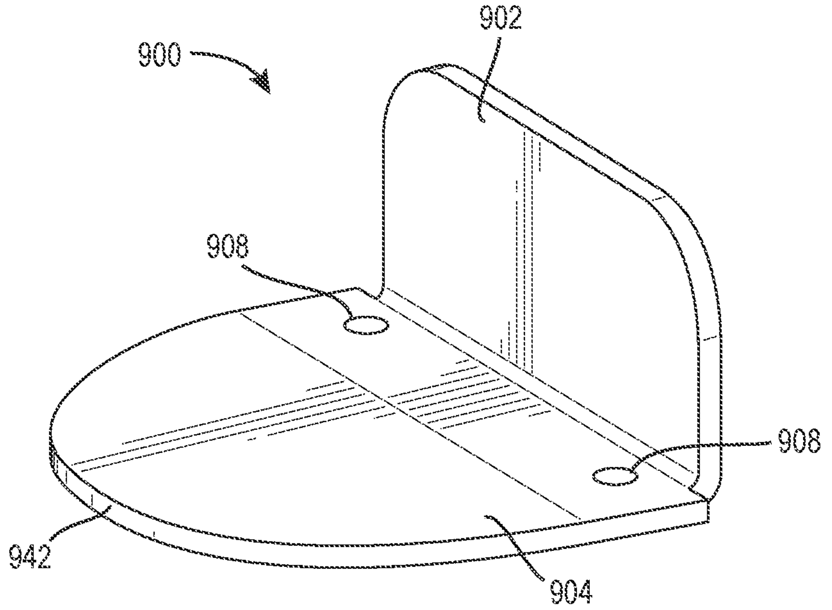
FIG. 9 is a perspective view of another aspect of a deflector for a concealed sprinkler assembly, according to an example implementation.

Referring now to FIG. 9, a deflector 942 is shown. The deflector 942 is shown to include a back wall 902 configured substantially perpendicular to a top surface 904. The back wall 902 of the deflector 942 is shown to span the entirety of the width of the top surface 904, with the top surface 904 having a substantially semi-circle geometry. Contrary to other aspects of deflectors shown and described herein, the deflector 942 does not include arms extending from the back wall 902 and is thus configured to deflect fire exposure protection fluid over a substantially 180° range. The top surface 904 includes a pair of apertures 908 disposed on substantially opposite sides of the top surface 904. Additionally, in some aspects, the apertures 908 may also be configured to accommodate coupling to guide pins.

Figure 10:
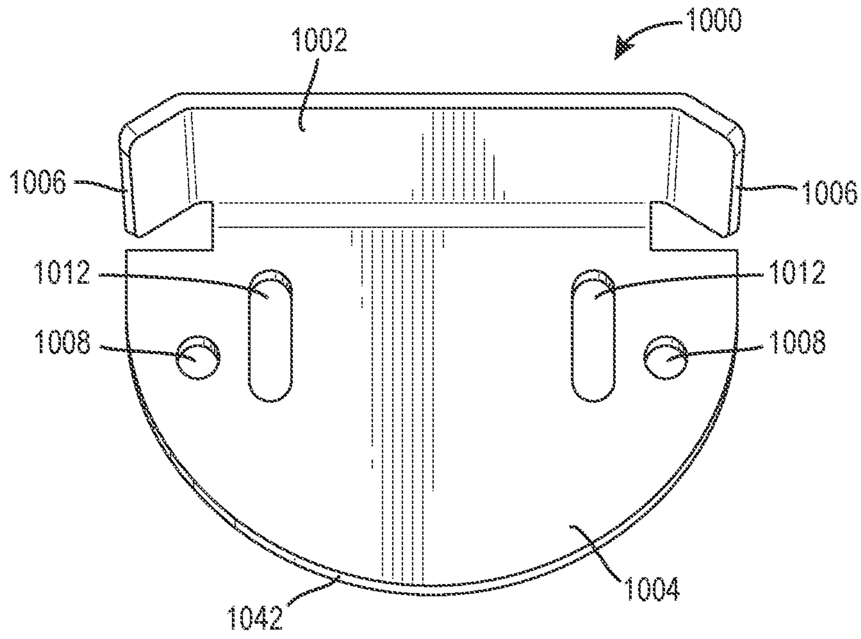
FIG. 10 is a perspective view of another aspect of a deflector for a concealed sprinkler assembly, according to an example implementation.

Referring now to FIG. 10, a deflector 1042 is shown. The deflector 1042 is shown to include a back wall 1002 configured substantially perpendicular to a top surface 1004. The back wall 1002 is shown to include a pair of arms 1006, with the arms 1006 extending laterally from opposite sides of the back wall 1002. The arms 1006 are configured to extend from the back wall 1002 at an acute angle in the direction of the top surface 1004. The top surface 1004 includes a pair of apertures 1008 disposed on substantially opposite sides of the top surface 1004. Additionally, in some aspects, the apertures 1008 may be configured to accommodate coupling to guide pins. Additionally, the top surface 1004 of the deflector 1042 includes a pair of elongated apertures 1012, with the elongated apertures 1012 configured on substantially opposite sides of the top surface 1004 and adjacent the apertures 1008. The elongated apertures 1012 may be configured to permit additional flow of fire exposure protection fluid through the deflector 1042, or may also be configured for coupling to other components such as, for example, guide pins.

Figure 11:
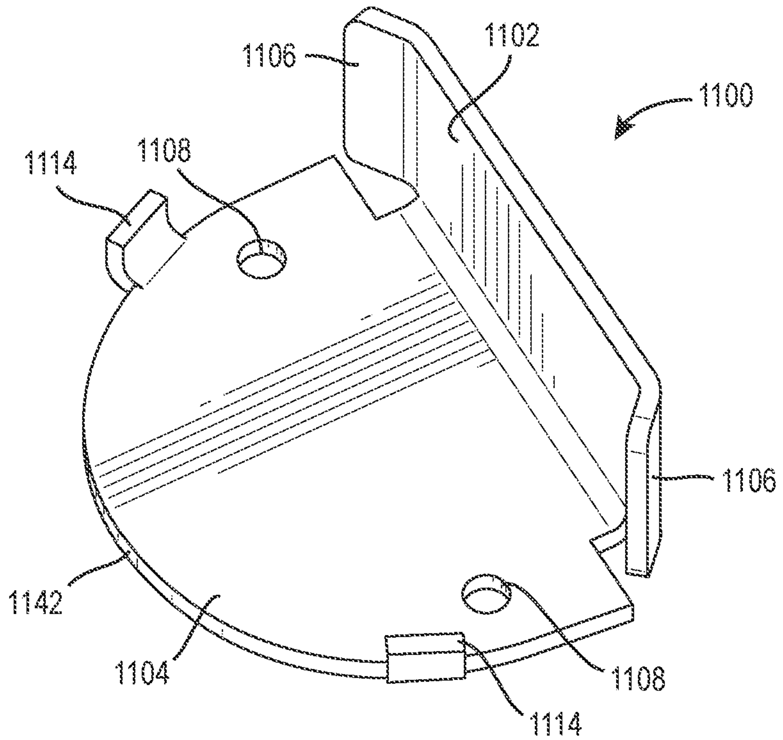
FIG. 11 is a perspective view of another aspect of a deflector for a concealed sprinkler assembly, according to an example implementation.

Referring now to FIG. 11, a deflector 1142 is shown. The deflector 1142 is shown to include a back wall 1102 configured substantially perpendicular to a top surface 1104. The back wall 1102 is shown to include a pair of arms 1106, with the arms 1106 extending laterally from opposite sides of the back wall 1102. The arms 1106 are configured to extend from the back wall 1102 at an acute angle in the direction of the top surface. The top surface 1104 includes a pair of apertures 1108 disposed on substantially opposite sides of the top surface 1104. Additionally, in some aspects, the apertures 1108 may be configured to accommodate coupling to guide pins. Additionally, the top surface 1104 of the deflector 1142 includes a pair of notches 1114, with the notches 1114 disposed on substantially opposite portions of the top surface 1104 and extending upward at an angle substantially perpendicular to the top surface 1104. The notches 1114 may moderate deflection rate of fire exposure protection fluid upon contact of the fire exposure protection fluid with the deflector 1142, or the notches 1114 may be configured to deflect a portion of the fire exposure protection fluid to an opposite side of the back wall 1102 so as to disperse a portion of the fire exposure protection fluid and thus provide fire exposure protection coverage to a window or windows opposite the back wall 1102 from the top surface 1104. The notches 1114 may be configured to deflect a portion of the fire exposure protection fluid to avoid spraying certain regions within the normal spray pattern.

Figure 12:
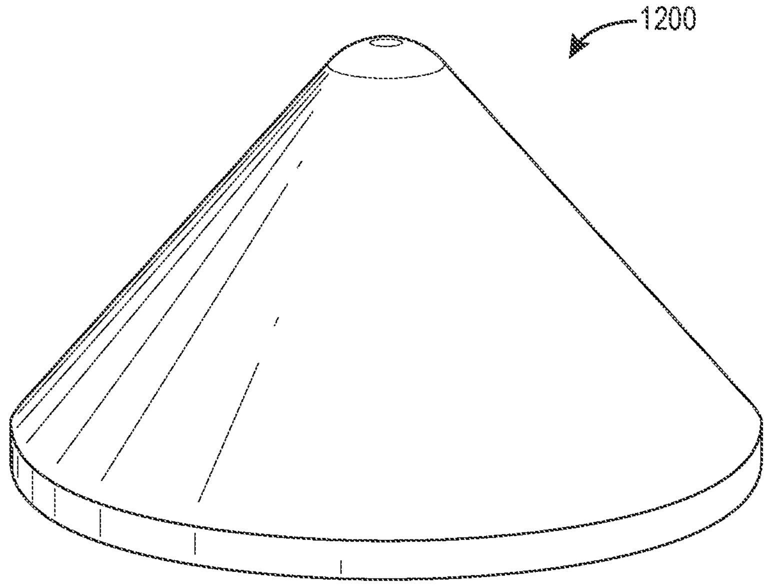
FIG. 12 is a perspective view of a geometry for a deflector for a concealed sprinkler assembly, according to an example implementation.
Figure 13:
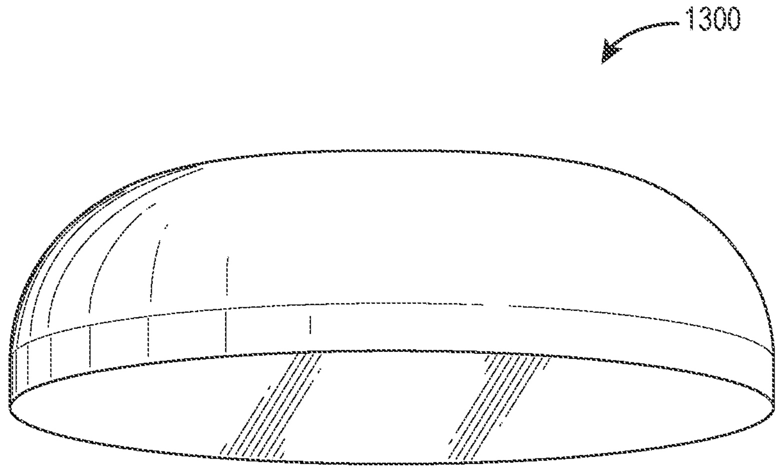
FIG. 13 is a perspective view of another aspect of a geometry for a deflector for a concealed sprinkler assembly, according to an example implementation.
Figure 14:
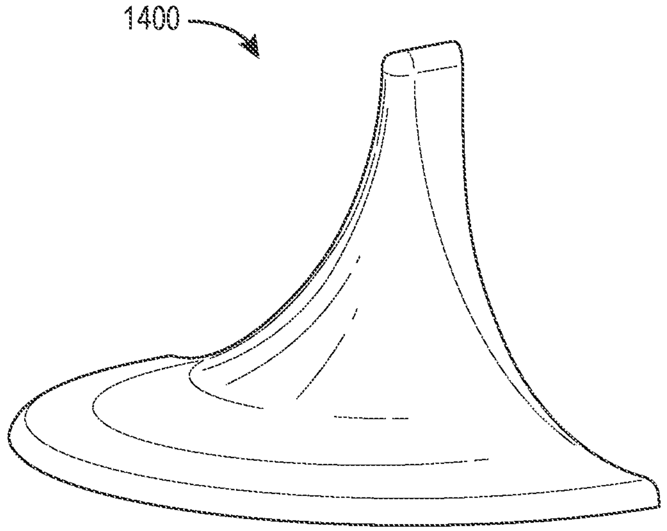
FIG. 14 is a perspective view of another aspect of a geometry for a deflector for a concealed sprinkler assembly, according to an example implementation.

Referring now to FIGS. 12-14, various geometries are shown which may be incorporated into the geometry of the deflectors as shown and described previously for use with the concealed sprinkler assembly 100 or similar. The geometries shown and described in FIGS. 12-14 may be incorporated into the deflectors variously, such as, for example, between the top surface and the back wall, or in substitute of the top surface. The geometries of FIGS. 12-14 are configured so as to deflect fire exposure protection fluid in conjunction with other portions of the deflectors so as to provide fire exposure protection coverage to a window or windows by deflecting a flow of fire exposure protection fluid to said window or windows.

FIG. 12 is shown to include a geometry 1200 that is configured to be substantially cone shaped. Such a cone shape may be configured on the top surface of a deflector such that the cone shaped geometry receives a vertical flow of a fire exposure protection fluid. Upon receipt of the fire exposure protection fluid, the geometry 1200 may be configured to deflect said fire exposure protection fluid at a desired trajectory via the cone shape, and corresponding to the desired trajectory and flow rate of the fire exposure protection fluid, a desired distance. Additionally, the geometry 1200 may be configured to provide a substantially 360° range of deflection of fire exposure protection fluid.

FIG. 13 is shown to include a geometry 1300 that is configured to be substantially dome shaped. Such a dome shape may be configured on the top surface of a deflector such that the top portion of the geometry 1300 receives a vertical flow of fire exposure protection fluid and thus deflects said flow of fire exposure protection fluid over a substantially 360° range. In incorporating the geometry 1300 into a deflector, the bottom portion of the geometry 1300 may be configured to be coupled to or otherwise incorporated in the configuration of the top surface of such a deflector.

FIG. 14 is shown to include a geometry 1400 that is configured to have a sloped portion. Such a sloped portion may be configured to receive a flow of fire exposure protection fluid vertically and subsequently deflect said fire exposure protection fluid at a desired trajectory and in a given direction, thus providing fire exposure protection for a given window or windows by deflecting fire exposure protection fluid a desired distance (via the desired trajectory) and direction. In order to be incorporated into a deflector, the sloped portion may be disposed between the top surface and the back wall, for example, as shown and described with reference to FIGS. 3-4.

Figure 15:
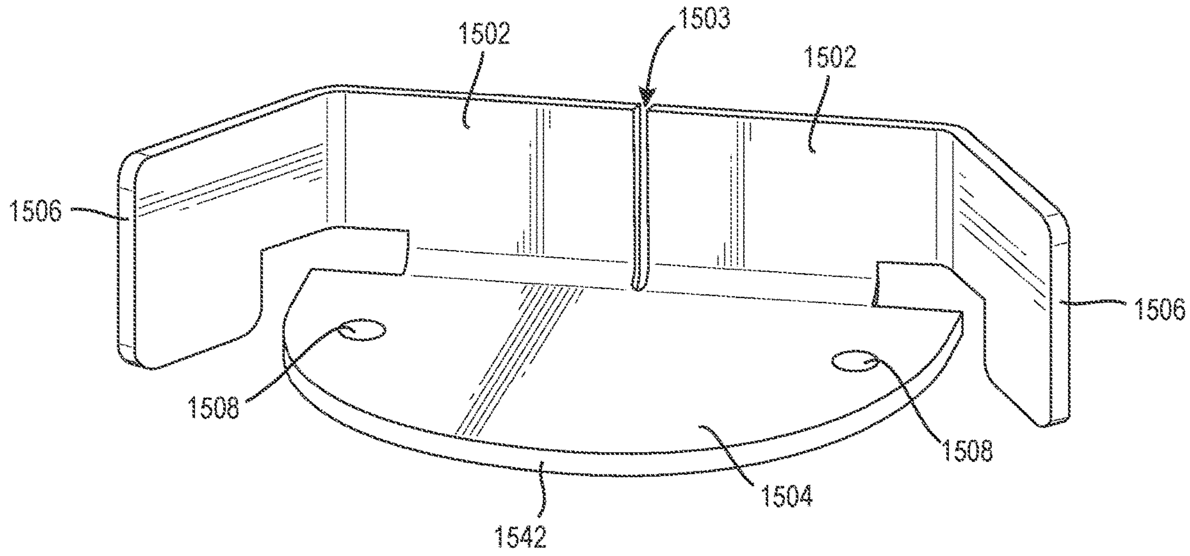
FIG. 15 is a perspective view of a geometry for a deflector for a concealed sprinkler assembly, according to an example implementation.

Referring now to FIG. 15, a deflector 1542 is shown. The deflector 1542 is shown to include a back wall 1502 configured substantially perpendicular to a top surface 1504. The back wall 1502 is shown to include a gap 1503 configured between lateral edges of the back wall 1502. The back wall 1502 is shown to include a pair of arms 1506, with the arms 1506 extending laterally from opposite sides of the back wall 1502. The arms 1506 are configured to extend from the back wall 1502 at an acute angle in the direction of the top surface 1504. The top surface 1504 includes a pair of apertures 1508 disposed on the top surface 1504. In some aspects, the apertures 1508 may be configured to accommodate coupling to guide pins.

Figure 16:
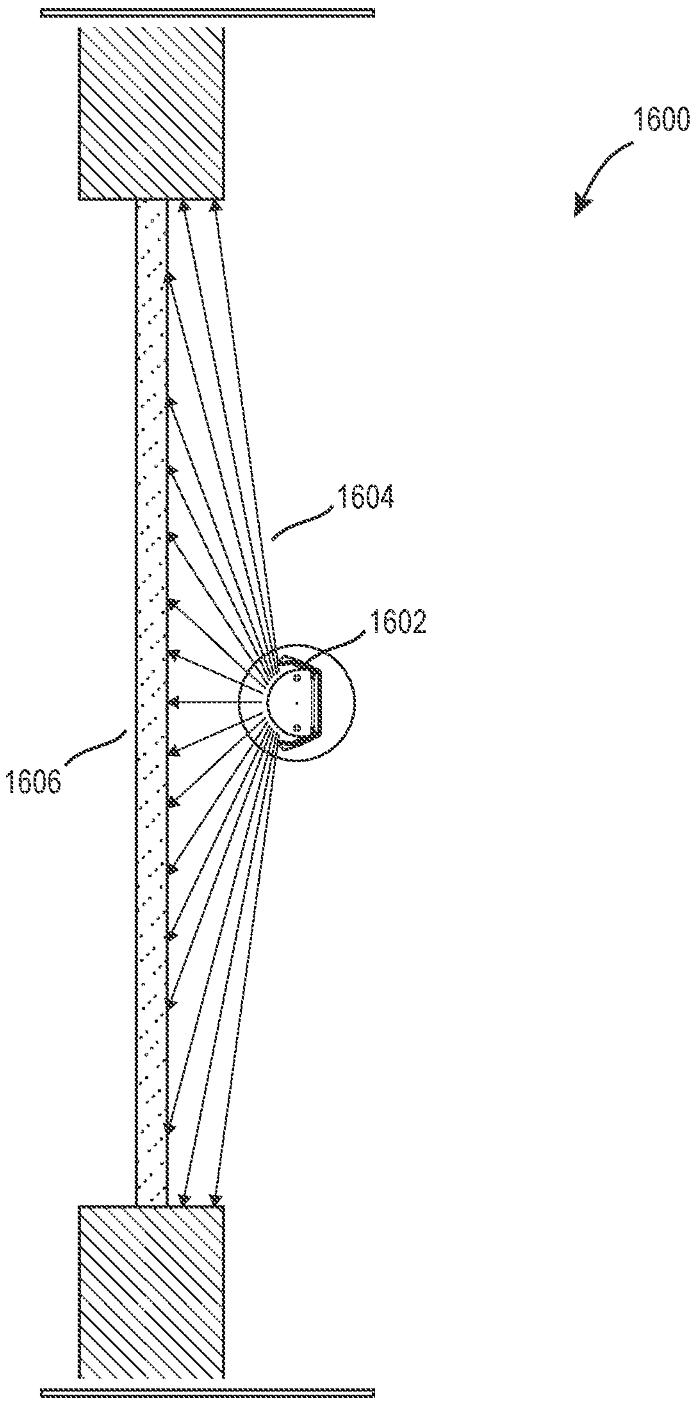
FIG. 16 is an illustration of a view of a spray pattern resulting from a deflector for a concealed sprinkler assembly, according to an example implementation.

Referring now to FIG. 16, a fire exposure protection system 1600 is shown. The system 1600 is shown to include a concealed fire sprinkler (not shown), which includes a deflector 1602 as shown. The deflector 1602 may be the same as and/or similar to other deflectors shown and described previously, for example the deflector 1542 of FIG. 15. The concealed fire sprinkler may be coupled with a fluid line (e.g., a portion of a system configured to provide fire exposure protection fluid to one or more sprinklers) and, in conjunction with the deflector 1602, is shown to provide a spray pattern 1604 for fire exposure protection fluid. The spray pattern 1604 shown in FIG. 16 may include water and/or other fire exposure protection fluid dispersed over a window 1606. In some aspects, the spray pattern 1604 may be configured to provide fire exposure protection fluid to one or more windows the same as or similar to the window 1606, or may be configured to provide fire exposure protection fluid to another component similar to the window 1606. In some aspects, the window 1606 may be a portion of a window assembly. Such a window assembly may include, for example, glazing, framing, silicone, sealant, and/or one or more vertical separations. Additionally, a window such as the window 1606 may be glazed glass, which can include for example ceramic glass, heat strengthened glass, and/or tempered glass. Additionally, in some aspects the window 1606 may be configured according to specific building codes and/or ordinances (e.g., the window and/or window assembly 1606 may not exceed 13 ft. per ULC/ORD-C263.1-99).

The deflector 1602 shown to produce the spray pattern 1604 shown in FIG. 16 may be a component of a concealed sprinkler assembly such as the concealed sprinkler assembly 100 as shown and described previously. Additionally, the deflector 1602 shown to produce the spray pattern 1604 of FIG. 16 may be configured to extend from a recess configured within a ceiling, where the recess is configured to accommodate a concealed sprinkler assembly. Upon deployment of the deflector 1602 as shown in FIG. 16 and activation of the concealed sprinkler assembly in response to a fire, the spray pattern 1604 as shown in FIG. 16 may be produced so as to provide fire exposure protection to one or more windows. In some aspects, the spray pattern 1604 provided by the deflector 1602 is configured to provide fire exposure protection fluid to the window 1606 (or, in some aspects, a wall or other area) to wet the surface of the window 1606 from the top of an identified protection area thereon to the bottom of said identified protection area. Similarly, the deflector 1602 can be configured to provide the spray pattern 1604 consistently for the entirety of a specified time frame. For example, the deflector (in conjunction with a concealed fire sprinkler) may provide the spray pattern 1604 for two hours, corresponding to the window 1606 having a two hour fire rating). The deflectors as shown and described previously as well as the concealed sprinkler assembly 100 may also be configured to provide spray patterns other than that shown in FIG. 16, for example to provide fire exposure protection for windows of different sizes and locations.

Figure 17:
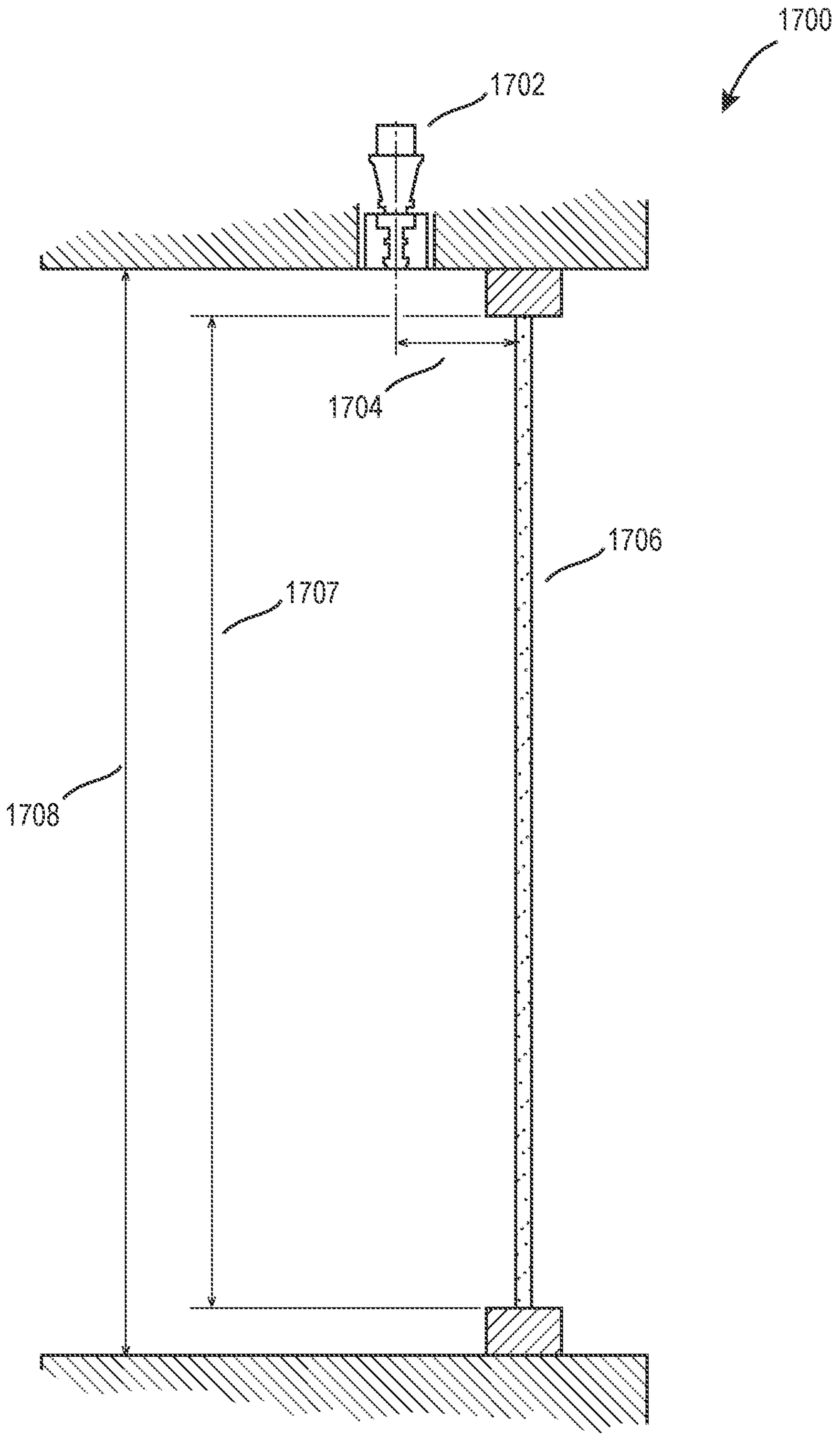
FIG. 17 is an illustration of a view of a concealed window sprinkler arranged adjacent a window, according to an example implementation.

Referring now to FIG. 17, fire exposure protection system 1700 is shown. The system 1700 is shown to include a concealed fire sprinkler 1702, which includes a deflector (not shown) where the deflector may be the same as and/or similar to the deflectors as shown and described previously (e.g., the deflector 1602 of FIG. 16). The concealed fire sprinkler 1702 may be the same as and/or similar to other concealed fire sprinklers shown and described previously. The concealed fire sprinkler 1702 may be coupled with a fluid line (e.g., a portion of a system configured to provide fire exposure protection fluid to one or more sprinklers) and, is shown to provide a spray pattern 1704 for fire exposure protection fluid. The spray pattern 1704 shown in FIG. 17 may include water and/or other fire exposure protection fluid dispersed over a window 1706. The window 1706 is shown to extend a height 1707 within an area having a height 1708. Further, the concealed fire sprinkler 1702 is shown to be arranged a distance 1704 from the window 1706. In some aspects, the concealed fire sprinkler 1702 may be configured to provide a spray pattern similar to the spray pattern 1604 as shown and described previously, with said spray pattern configured to provide fire exposure protection fluid to the window 1706. In some aspects, the aforementioned spray pattern may be configured to provide fire exposure protection fluid to one or more windows the same as or similar to the window 1706, or may be configured to provide fire exposure protection fluid to another component similar to the window 1706. Additionally, in some aspects the concealed fire sprinkler 1702 may be arranged a distance other than the distance 1704 from the window 1706. For example, the concealed fire sprinkler 1702 may be arranged closer to or further from the window 1706 than the distance 1704 in order to provide fire exposure protection fluid to various sizes of windows the same as or similar to the window 1706. Additionally, the concealed fire sprinkler 1702 shown in FIG. 17 may be configured to extend from a recess configured within a ceiling, where the recess is configured to accommodate a concealed sprinkler assembly. The concealed fire sprinkler as shown and described previously as well as the concealed sprinkler assembly 100 may also be configured to provide spray patterns other than that shown in FIG. 16, for example to provide fire exposure protection for windows of different sizes and locations. In some aspects the deflector 1700 may be configured to provide a spray pattern that is 180 degrees or less from the center of the deflector 1700 (or a corresponding concealed fire sprinkler) in the direction of the window 1706 (e.g., the spray pattern is in the direction of the distance 1704 relative to the concealed fire sprinkler 1702. In some aspects, concealed fire sprinklers such as the concealed fire sprinkler 1702 may be arranged on opposite sides of a window and/or wall so as to provide fire exposure protection for multiple sides/faces of the substantially parallel window and/or wall.

Figure 18:
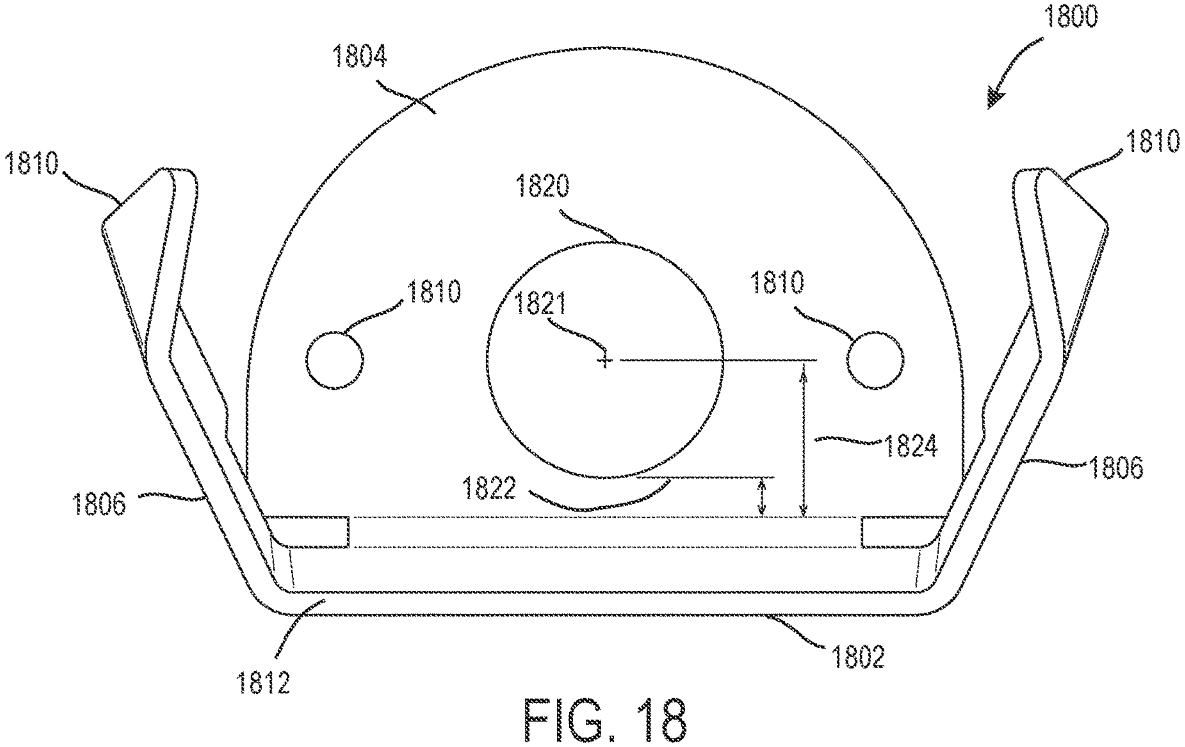
FIG. 18 is a top view of an aspect of a geometry for a deflector for a concealed sprinkler assembly, according to an example implementation.
Figure 19:
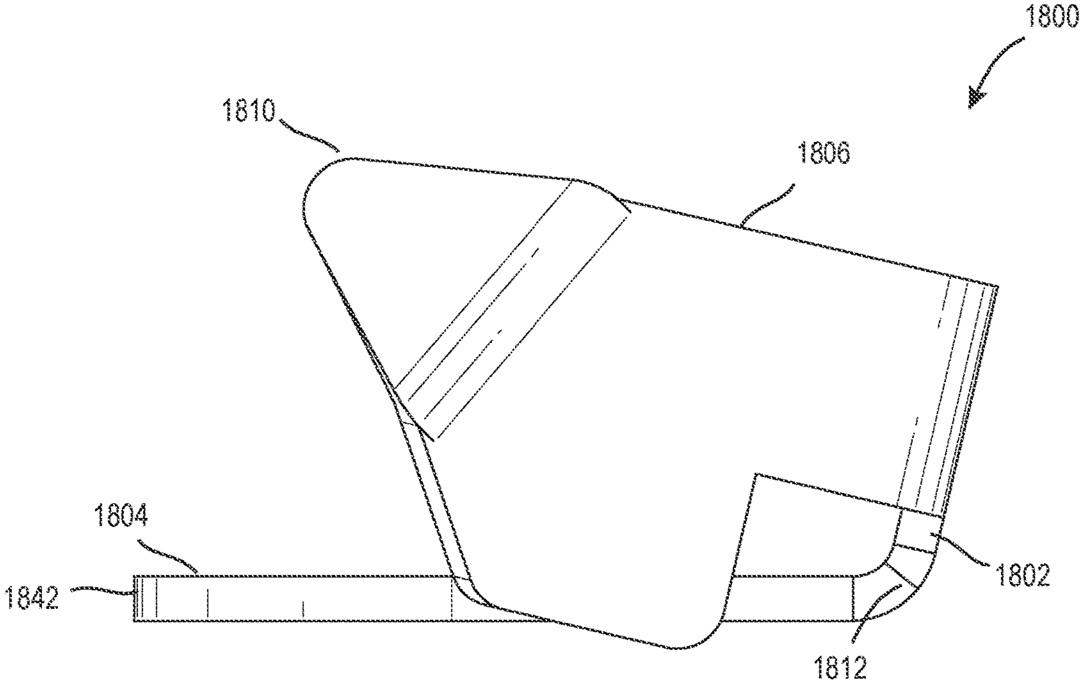
FIG. 19 is a side view of the aspect of a geometry of FIG. 18 for a deflector for a concealed sprinkler assembly, according to an example implementation.

Referring now to FIGS. 18-19, a deflector 1800 is shown. The deflector 1800 is shown to include a back wall 1802 configured adjacent a top surface 1804. The back wall 1802 is shown to include a transition area 1812 where the back wall 1802 transitions to the top surface 1804. In some aspects, the transition area 1812 may include various geometries, for example those shown in FIGS. 12-14 of the present application. Additionally, the transition area 1812 may also include various other geometries such as the curvature shown in the exemplary aspect of FIGS. 18-19. In some aspects, the transition area 1812 may be structured to accommodate the back wall 1802 relative to the top surface 1804, or accommodate the top surface 1804 relative to the back wall 1802. For example, in the exemplary aspect of FIGS. 18-19, the back wall 1802 is shown to form an obtuse angle with the top surface 1804. However, in alternative aspects the back wall 1802 may form a substantially right angle with the top surface 1804 (e.g., orthogonal), or may form an acute angle with the top surface 1804.

The back wall 1802 is further shown to include a pair of arms 1806, with the arms 1806 extending laterally from opposite sides of the back wall 1802. The arms 1806 are configured to extend from the back wall 1802 at an acute angle in the direction of the top surface 1804. Additionally, each of the arms 1806 is shown to include an angled portion 1810, where the respective angled portions 1810 are angled laterally toward the top surface 1804 of the deflector 1800. In some aspects, the arms 1806 and the angled portions 1810 thereof may be configured alternatively, for example the angled portions 1810 may be arranged at alternative angles to those shown in the exemplary aspect of FIGS. 18-19. Both the arms 1806 and the angled portions 1810 may be configured to provide a desired spray pattern for a concealed fire sprinkler such as those shown and described previously (e.g., the arms 1806 and the angled portions 1810 may be configured to provide a spray pattern for a fire exposure protection fluid to be provided to a window of known dimensions). In some aspects, the arms 1806 and/or the angled portions 1810 may be configured such that at least a portion of thereof extends in a vertical direction below the top surface 1804 of the deflector 1800.

The top surface 1804 includes a pair of apertures 1808 disposed on the top surface 1804. In some aspects, the apertures 1808 may be configured to accommodate coupling to guide pins such as those of various concealed sprinkler assemblies as shown and described previously. Additionally, the apertures 1808 may be arranged variously about the top surface 1804 of the deflector 1800. For example, the apertures 1808 may be arranged a specific distance from the back wall 1802 such that guide pins interfacing with the apertures 1808 do not interfere with a spray pattern of a fire exposure protection fluid provided by the deflector 1800.

As shown in FIG. 18, the top surface 1804 of the deflector 1800 is shown to include a circle 1820 disposed in a central portion of the top surface 1804. In some aspects, the circle 1820 may be printed, embossed, engraved, or otherwise marked on the top surface 1804. The circle 1820 can be shown to indicate a desired contact area for fire exposure protection fluid to be provided by a concealed fire sprinkler and ultimately dispersed by the deflector 1800 in a desired spray pattern, for example the spray pattern 1604 of FIG. 16. Similarly, in some aspects such as that of FIG. 18, the circle 1820 may correspond to a lateral dimension of an orifice through which a fire exposure protection fluid may pass prior to contacting the top surface 1804 of the deflector 1800. As shown in FIG. 18, the circle 1820 includes a center point 1821 (e.g., the center of the circle through which a diametrical line passes, an end point of a radius opposite a start point positioned on the circle). The center point 1821 (and, accordingly, the circle 1820) are disposed equidistant between the apertures 1808 in the exemplary aspect shown in FIG. 18. However, in some aspects the center point 1821 and the circle 1820 may be disposed otherwise about the top surface 1804. The circle 1820 and the center point 1821 can be reference points for manufacturing, installation, and other processes and procedures associate with the deflector 1800 and, more generally, a concealed fire sprinkler. For example, one aspect of the deflector 1800 such as that shown in FIG. 18 may include a specific distance 1824 between the center point 1821 and the back wall 1802 of the deflector. Similarly, one or more other aspects of the deflector 1800 may include a specific distance 1822 between the outer edge of the circle 1820 and the back wall 1802. Such specific distances may correspond to different applications or may further correspond to different spray patterns provided by the deflector 1800. In some aspects, the circle 1800 may be disposed such that the back wall 1802 is arranged within 0.25 inches from the outer edge of the circle 1820 nearest the back wall 1822. Accordingly, a corresponding design specification may indicate that the distance 1822 is not to exceed 0.25 inches, for example. Similarly, the circle 1820 may be disposed such that the center point 1821 of the circle is arranged a set distance (e.g., 0.5 inches) from the back wall 1802. Accordingly, a corresponding design specification may indicate that the distance 1824 is not to exceed 0.5 inches. Further, in some aspects of the deflector 1800, the circle 1820, the center point 1821, and the distances 1822, 182 may be arranged variously in respect to the back wall 1802, a front edge 1842, or other components of the deflector 1800 in order to facilitate manufacturing, installation, or other processes/procedures associated with the deflector 1800 and/or a corresponding concealed fire sprinkler.

It should be noted that the various geometries of deflectors for implementation with the concealed sprinkler assembly 100 as shown and described and/or other similar systems may be modified in order to deflect fire exposure protection fluid and ultimately disperse said fire exposure protection fluid for a given window or windows. For example, angles may be modified such as substantially 90° angles modified to become slightly acute or obtuse (for example, increasing or decreasing angles 10-15°). Additionally, components and geometries of the deflectors as shown and described herein may be variously combined so as to deflect fire exposure protection fluid and ultimately provide fire exposure protection for a given window or windows. Such modifications may include increased width, height, depth, and thickness of various components of the deflectors.

As utilized herein, the terms "approximately," "about," "substantially", and similar terms are intended to include any given ranges or numbers+/−10%. These terms include insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The construction and arrangement of the fitting assembly as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A concealed window sprinkler assembly, comprising:

a housing comprising a pair of legs, each leg defining an aperture, each leg extending longitudinally about an axis through the housing;

a sealing assembly coupled with the housing, the sealing assembly to become unsealed responsive to a fire;

a pair of guide pins, each guide pin of the pair of guide pins received in a respective aperture of a respective foot of each leg of the pair of legs, each guide pin of the pair of guide pins comprising a head sized to not move through the aperture; and a deflector coupled with the pair of guide pins, the deflector comprising a top surface comprising a front edge, a back wall opposite the front edge, and a pair of arms, the back wall having a straight distal edge in a first plane, the back wall angled relative to the top surface, each arm of the pair of arms forming a gap with the top surface, each arm comprising a portion from a first corner that is spaced from the straight distal edge and laterally outward from the gap relative to the axis to a second corner further from straight distal edge than the first corner, the portion extends linearly laterally outward from the pair of guide pins and the top surface relative to the axis, and in each of a second plane and a third plane that are each different from the first plane, wherein each arm of the pair of arms forms the gap such that a fourth plane through the gap is between the first corner and the straight distal edge.

2. The concealed window sprinkler assembly of claim 1, wherein the straight distal edge is wider than a diameter of the top surface.

3. The concealed window sprinkler assembly of claim 1, comprising:

the back wall is substantially perpendicular to the top surface.

4. The concealed window sprinkler assembly of claim 1, comprising:

an angle between the top surface and the back wall is greater than or equal to 90 degrees and less than or equal to 105 degrees.

5. The concealed window sprinkler assembly of claim 1, comprising:

a K-factor of 5.6 $(gpm)/(psi)^{1/2}$ or less.

6. The concealed window sprinkler assembly of claim 1, comprising:

the pair of legs are spaced 180 degrees from each other around the axis.

7. The concealed window sprinkler assembly of claim 1, wherein the deflector comprises a pair of sidewalls, each sidewall between the portion and the top surface and outward from the gap relative to the axis.

8. A sprinkler, comprising:

a housing;

a first leg extending from the housing about an axis through the housing, the first leg having a first foot defining a first aperture;

a second leg extending from the housing about the axis, the second leg having a second foot defining a second aperture;

a sealing assembly coupled with the housing;

a first guide pin received in the first aperture, the first guide pin comprising a first head to restrict movement of the first guide pin through the first aperture; a second guide pin received in the second aperture, the second guide pin comprising a second head to restrict movement of the second guide pin through the second aperture; and a deflector comprising a top surface comprising a front edge, a back wall opposite the front edge extending from the top surface to a straight distal edge at an angle greater than or equal to 90 degrees and less than or equal to 105 degrees, a pair of arms, and a pair of sidewalls, the front edge has a convex curvature around a center of the front edge, the straight distal edge is in a first plane, the deflector coupled with the first guide pin and the second guide pin such that an outer edge of the deflector is outward from where the first guide pin and the second guide pin are coupled with the deflector, a top edge of each arm of the pair of arms has a straight portion in each of a second plane different than the first plane and a third plane different than the first plane and extends laterally outward from the pair of guide pins and the top surface relative to the axis, wherein each arm of the pair of arms forms the gap such that a fourth plane through the gap is between the first corner and the straight distal edge.

9. The sprinkler of claim 8, wherein the straight distal edge is wider than a diameter of the top surface.

10. The sprinkler of claim 8, comprising:

the first leg and the second leg extend around the sealing assembly.

11. The sprinkler of claim 8, comprising:

the deflector has a geometry to deflect fluid receive through the housing to a window.

12. The sprinkler of claim 8, comprising:

the pair of legs are spaced 180 degrees from each other around the axis.

13. The sprinkler of claim 8, comprising:

a mount extending from the housing, the mount defining an opening to receive fluid.

14. A concealed sprinkler, comprising:

a housing comprising a pair of legs, each leg defining an aperture, each leg extending longitudinally about an axis through the housing;

a mount extending from the housing in an opposite direction from the pair of legs;

a sealing assembly coupled with the housing, the sealing assembly to become unsealed responsive to a fire;

a pair of guide pins, each guide pin of the pair of guide pins received in a respective aperture of a respective foot of each leg of the pair of legs, each guide pin of the pair of guide pins comprising a head sized to not move through the aperture; and a deflector coupled with the pair of guide pins, the deflector comprising a top surface comprising a front edge, a back wall opposite the front edge extending from the top surface to a straight edge, the straight edge is in a first plane, the back wall angled relative to the top surface at an angle greater than or equal to 90 degrees and less than or equal to 105 degrees, and a pair of arms, the front edge has a convex curvature, each arm of the pair of arms forms a gap with the top surface, each arm of the pair of arms has a straight portion spaced from the straight edge, each arm of the pair of arms is in each of a second plane and a third plane that are each different from the first plane, wherein the second plane and the third plane cross the gap.

* * * * *